United States Patent [19]

Kitabayashi

[11] Patent Number: 5,487,058
[45] Date of Patent: Jan. 23, 1996

[54] OPTICAL PICK-UP SYSTEM WITH IMPROVED LIGHT-CONVERGENCE CONSTRUCTION

[75] Inventor: Junichi Kitabayashi, Kawasaki, Japan

[73] Assignee: Ricoh Company, Ltd., Tokyo, Japan

[21] Appl. No.: 191,321

[22] Filed: Feb. 2, 1994

[30] Foreign Application Priority Data

| Feb. 9, 1993 | [JP] | Japan | 5-021177 |
| May 6, 1993 | [JP] | Japan | 5-127783 |
| May 20, 1993 | [JP] | Japan | 5-139839 |

[51] Int. Cl.$^6$ ............................................ G11B 7/135
[52] U.S. Cl. ............... 369/112; 369/44.24; 369/44.41; 369/120; 369/118; 369/44.14
[58] Field of Search .................. 369/112, 44.23, 369/44.24, 122, 44.42, 44.41, 120, 110, 44.37, 44.14, 118

[56] References Cited

U.S. PATENT DOCUMENTS

| 4,592,038 | 5/1986 | Kubota et al. | 369/118 |
| 4,817,074 | 3/1989 | Yamanaka | 369/44.42 |
| 5,073,888 | 12/1991 | Takahashi et al. | 369/112 |
| 5,126,988 | 6/1992 | Nishiguma et al. | 369/44.42 |
| 5,153,864 | 10/1992 | Ishika | 369/44.23 |
| 5,161,139 | 11/1992 | Inoue et al. | 369/44.23 |
| 5,281,802 | 1/1994 | Kitabayashi | 369/44.42 |

FOREIGN PATENT DOCUMENTS

| 62-18973 | 4/1987 | Japan | G11B 7/09 |
| 2-126429 | 5/1990 | Japan | G11B 7/095 |

*Primary Examiner*—Georgia Y. Epps
*Assistant Examiner*—Kim-Kwok Chu
*Attorney, Agent, or Firm*—Cooper & Dunham

[57] ABSTRACT

An objective lens causes light emitted from the light source to converged onto an optical recording medium. A beam splitter separates light, reflected from the optical recording medium, from the bundle of rays emitted from the light source. A detective lens causes the light separated by means of the beam splitter to be converged. A detective photosensitive element is disposed at a position at which the light converged by means of the detective lens approximately converges. The detective lens has a first and second surfaces. The first surface faces the beam splitter and is formed to be convex so as to cause the bundle of rays to converge. The second surface comprises two surfaces which are combined with one another so that the line of intersection, formed where the two surfaces meet, does not intersect the axis associated with the convexity of the first surface.

24 Claims, 13 Drawing Sheets

FIG. 1A PRIOR ART
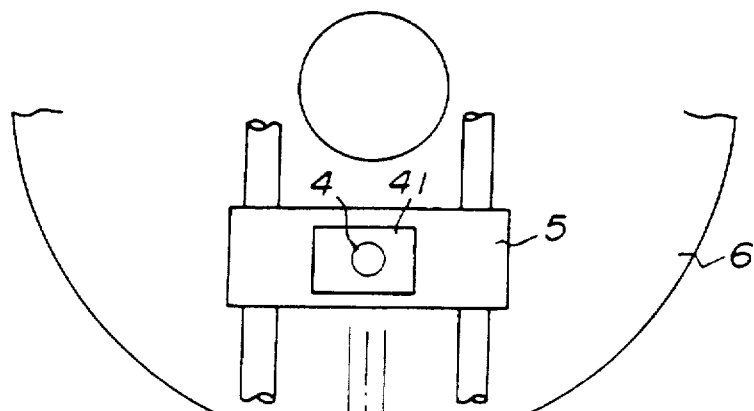
FIG. 1B PRIOR ART
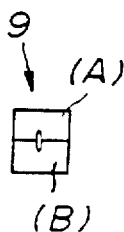
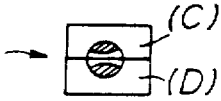
FIG. 1C PRIOR ART
FIG. 1D PRIOR ART
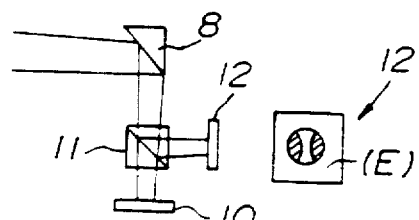
FIG. 1F PRIOR ART
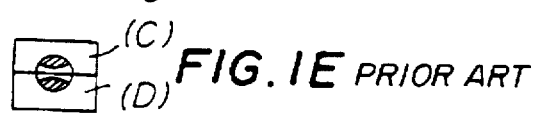
FIG. 1E PRIOR ART

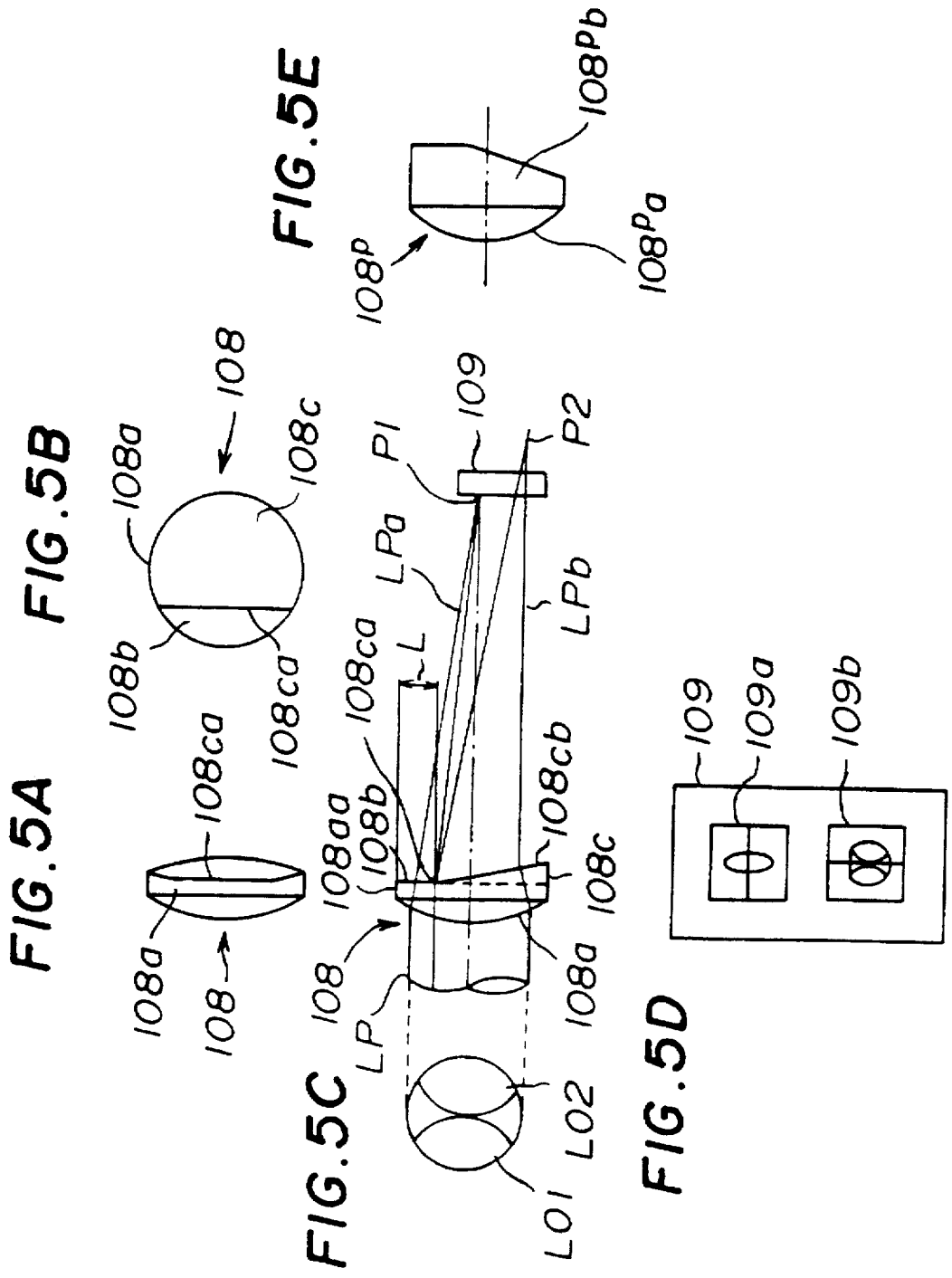

FIG. 8
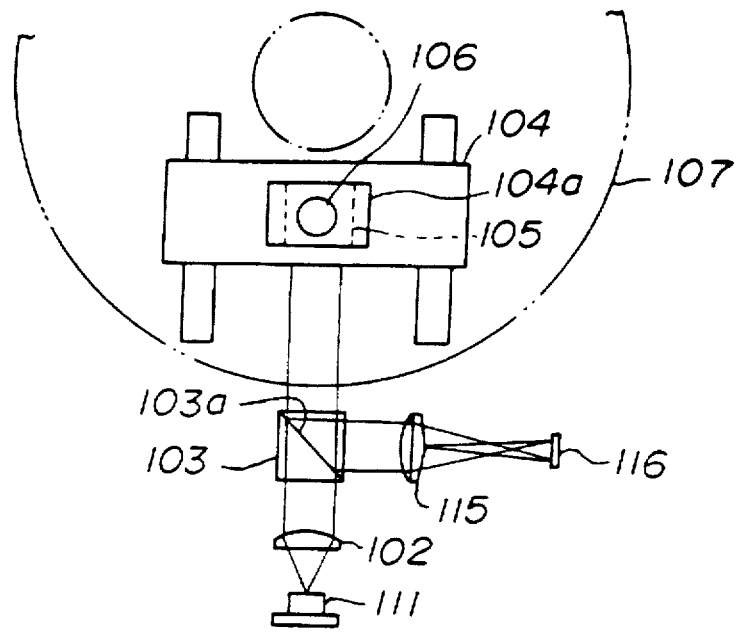
FIG. 9A
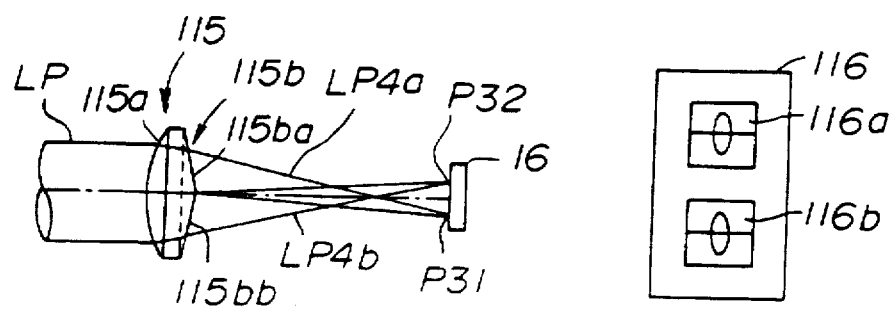
FIG. 9B
FIG. 9C
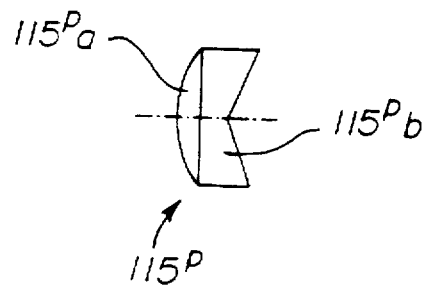

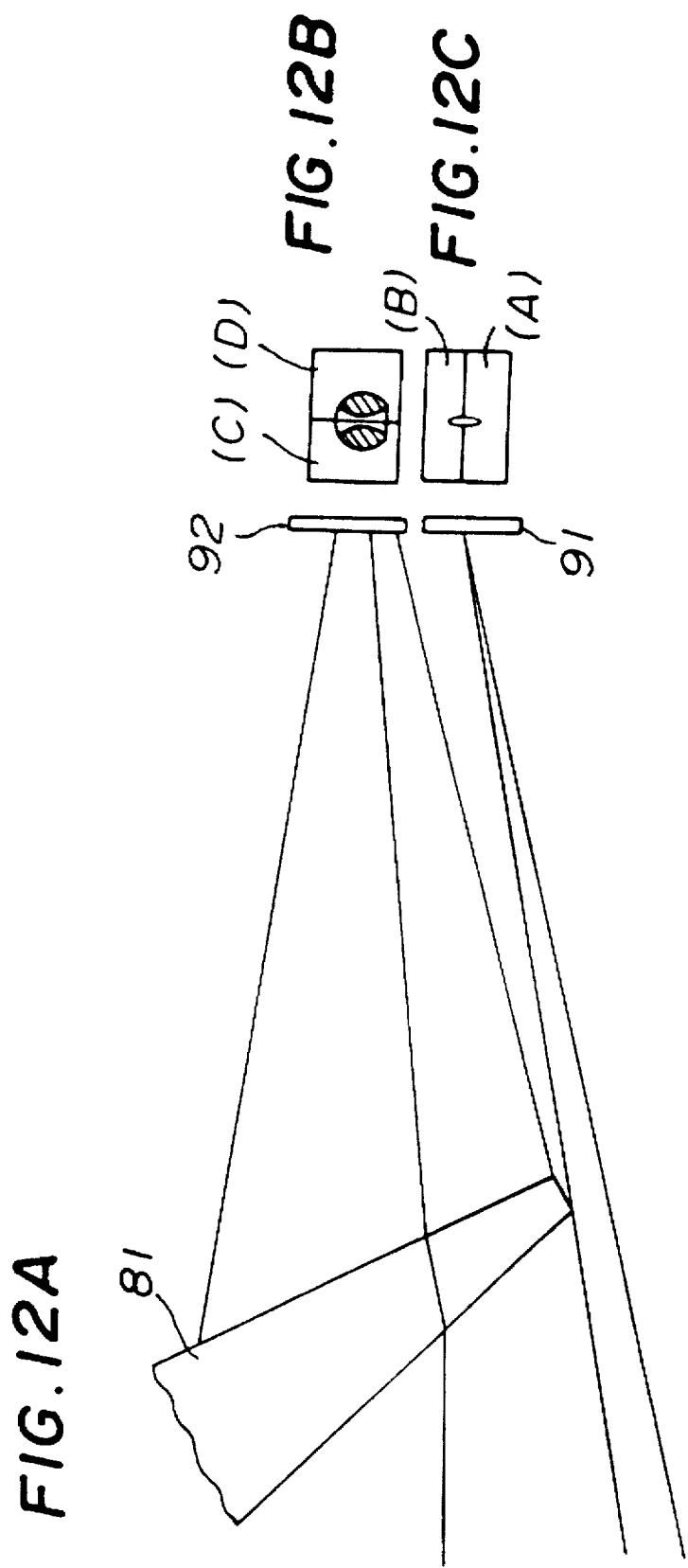

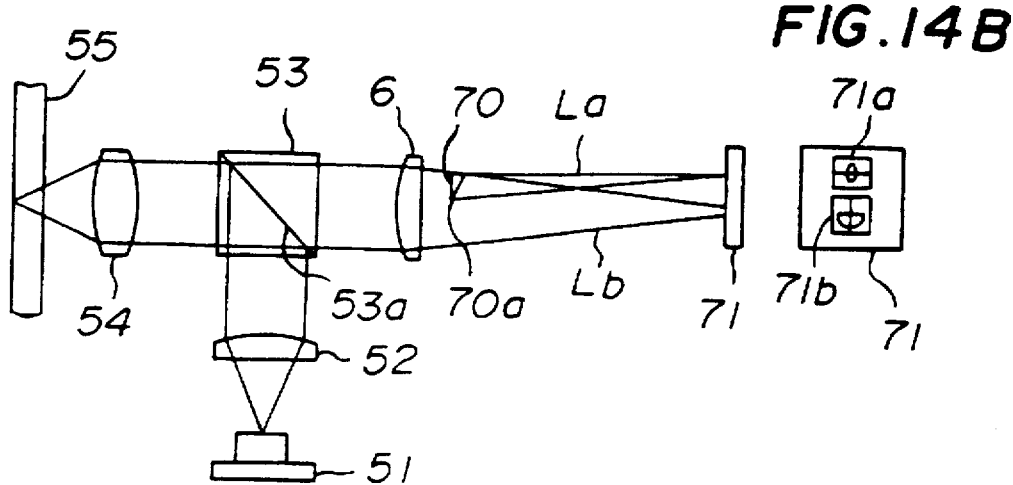
FIG. 14A
FIG. 14B
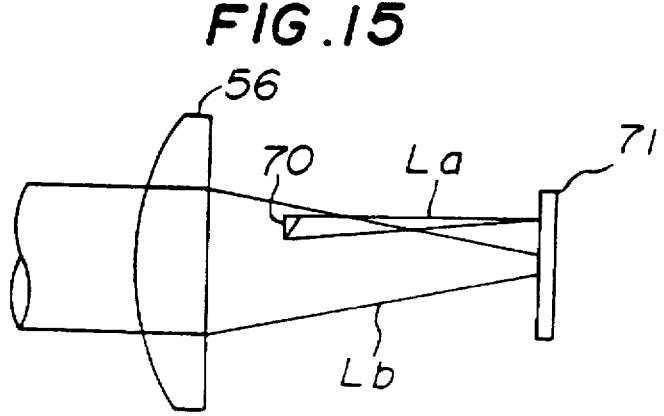
FIG. 15
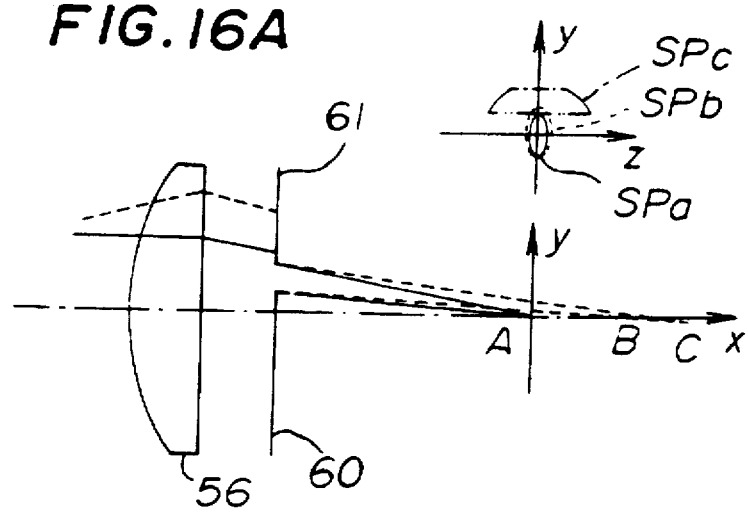
FIG. 16A
FIG. 16B

FIG.17A
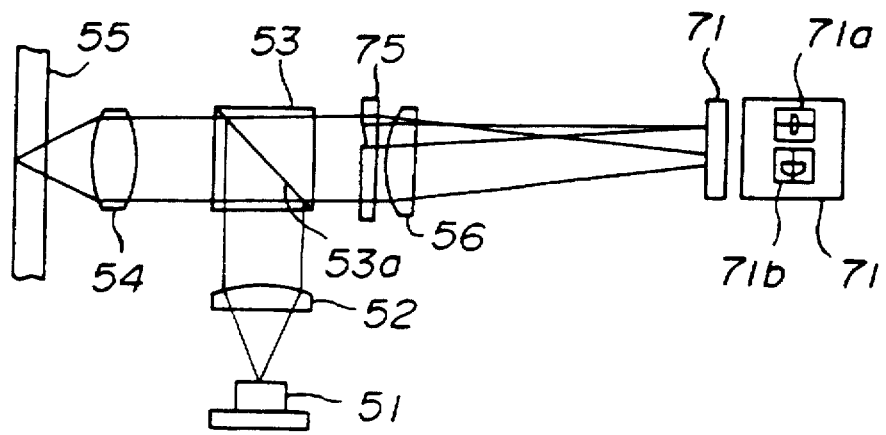
FIG.17B
FIG.18A
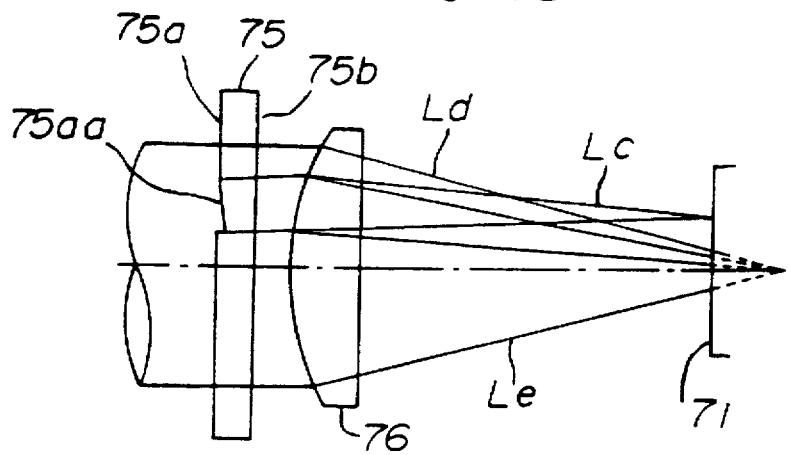
FIG.18B
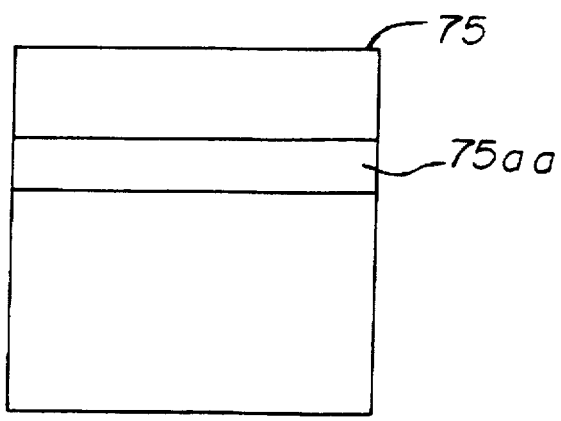

FIG.19A
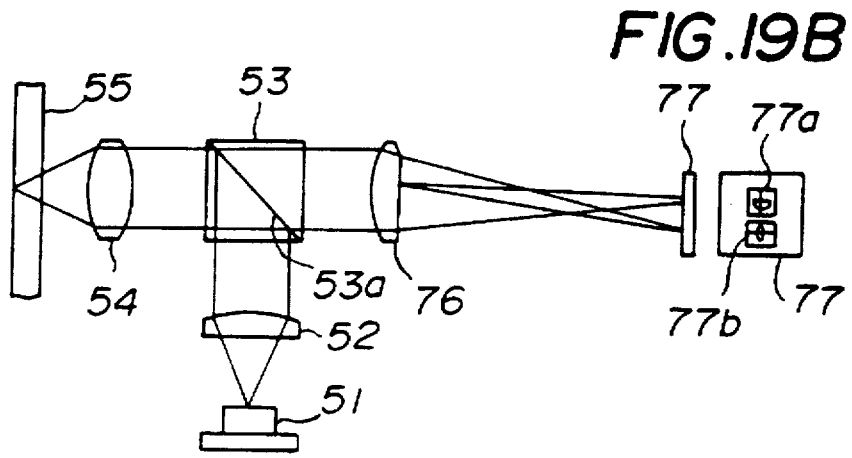
FIG.19B
FIG.20A
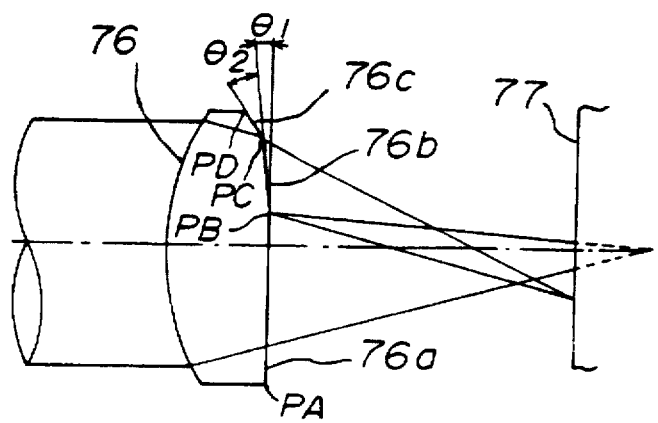
FIG.20B
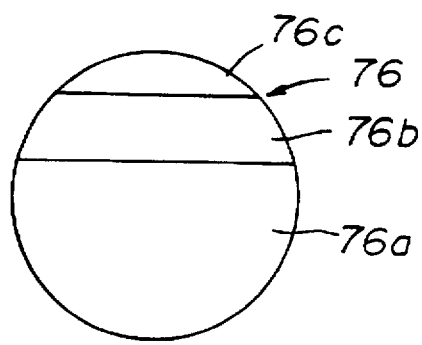

OPTICAL PICK-UP SYSTEM WITH IMPROVED LIGHT-CONVERGENCE CONSTRUCTION

BACKGROUND OF THE INVENTION

1. Field of the Invention

A first aspect of the present invention relates to an optical pick-up system comprising:

a light source for emitting light;

an objective lens for causing light emitted from said light source to converge onto an optical recording medium;

a beam splitter for separating light, reflected from said optical recording medium, from the bundle of rays emitted from said light source;

a detective lens for causing said light separated by means of said beam splitter to converge; and a detective photosensitive element disposed at a position at which the light converged by means of said detective lens approximately converges.

A second aspect of the present invention relates to an optical pick-up system used for writing optical information onto/reading optical information from/erasing optical information from an optical information recording disc such as a so-called compact disc or magneto-optical disc.

A third aspect of the present invention relates to an optical pick-up system comprising:

a light source for emitting light;

an objective lens for converging the bundle of rays emitted from said light source on an optical recording medium;

a beam splitter for separating the light, reflected by said optical recording medium, from said bundle of rays emitted from said light source; and a detective optical system for introducing the separated reflected light thereto as detective light, said detective optical system then forming various signals.

2. Related Art

Such an optical pick-up system is used for writing optical information onto/reading optical information from an optical recording medium in an optical writing/reading apparatus such as a magneto-optical disc apparatus, write-once type optical disc apparatus, CD-ROM apparatus, and audio CD apparatus. Various kinds of focusing-error detecting methods are used in such an optical pick-up system. Such a focusing-error detecting method is used for detecting a focusing error of a laser beam, the laser beam being used for writing optical information onto/reading optical information from (and erasing optical information from) the optical recording medium.

In particular in the above various methods, the knife-edge method (refer to Japanese Patent Publication No.62-18973) and the Faucault method, that is the so-called double-knife-edge method (refer to Japanese Laid-Open Patent Application NO.20126429) are effective to obtain high detective sensitivity but have relatively simple constructions.

However, such methods may exhibit certain disadvantages, as described below.

Normally, high accuracy is required in the positioning adjustment of the light-reception surface of the detective photosensitive element. This is because the spot diameter of the detective bundle of rays is considerably small on the detective photosensitive element which receives the detective bundle of rays.

The shape of the detective bundle of rays on the light-reception surface is determined based on the spatial relationship between the detective lens for converging the detective bundle of rays and the knife edge inserted in the detective bundle of rays.

Therefore, in the case where the knife edge method is applied, high precision is required in disposing the knife edge such that the proportion of the bundle of rays to be blocked by the knife edge (light-blocking ratio) and the angle of obliqueness of the knife edge are appropriately adjusted. On the other hand, in the case where the Faucault method is applied there, high accuracy is required in positioning adjustment of the roof prism for splitting the bundle of rays. Thus, in both cases, the positioning adjustment is a difficult or delicate procedure.

In an optical pick-up system, focusing control is performed for properly converging the bundle of rays emitted from the light source on the recording surface of the optical recording medium. Focusing control using the knife edge method is effective because the detection sensitivity thereof is high but has a simple construction as mentioned above. However, in the case where the knife edge method is used, a disadvantage may occur wherein the part of bundle of rays blocked by the knife edge is not used redundant. Thus, the light is not used efficiently due to this light loss.

In order to eliminate such a light loss, the following optical pick-up system may be used, as shown in FIGS. 1A and 1B. FIG. 1A shows a system construction for a case where an optical information recording medium 6 comprises a write once read many type optical disc. Here a write once read many type optical disc means an optical disc of a type such that data once written on the disc cannot be erased or overwritten.

A diverging bundle of rays emitted by a semiconductor laser 1 is made parallel bundle of rays by means of a collimating lens 2. Then, the resulting parallel bundle of rays is incident on a beam forming prism 31 constituting a composite prism 3. As a result, the flux cross section of the incident bundle of rays is beam-formed to be a desired shape (a circle or a near-circular ellipse) by being refracted and reflected therein. Then, after being thus beam-formed, the resulting bundle of rays is incident on an objective lens 4 via an optical semi-transparent surface 32 and a normal prism 33. Then, by the function of the objective lens 4, the incident bundle of rays is made to converge a light spot on the recording surface of the optical information recording medium 6. The objective lens 4 is integrated with a linearly seeking member 5 and runs along a path which intersects the rotational axis of and is parallel to the recording surface of the optical information recording medium 6.

The bundle of rays reflected by the recording surface is returned to the composite prism 3 via the objective lens and then reflected by the semi-transparent surface 32. Thus, the bundle of rays is separated from the light path that starts from the light source and ends at the recording surface. The thus separated bundle of rays is converted into a converging bundle of rays by means of a detective lens 7. Then, a part of the converted bundle of rays is incident on a photosensitive element 10 as a result of being reflected by the reflective prism 8. The remaining part of the bundle of rays which has not been reflected by the reflective prism converges on a photosensitive element 9.

The photosensitive element 9 comprises one which has two light-reception surfaces so that the first light-reception surface is located at the upper part and the second light-reception surface is located at the lower part in FIG. 1A. The respective light-reception surfaces then output the light-reception signals A and B. On the other hand, the photosensitive element 10 comprises one which has two light-reception surfaces so that the first light-reception surface is located at the front part and the second light-reception surface is located at the back part along a direction perpendicular to the plane of FIG. 1A. The respective light-reception surfaces of the photosensitive element 10 output the light-reception signals C and D.

A focusing-error signal is produced from the difference (A–B) and a tracking-error signal is produced from the difference (C–D). A data signal (reproduction or reading signal) is produced from the sum (A+B+C+D).

FIG. 1B shows a detective system in a case where the optical information recording medium 6 comprises a magneto-optical disc. The generation of the focusing-error signal is similar to that in the case of FIG. 1A. In the case where the optical information recording medium comprises the magneto-optical disc, the reflection bundle of rays obtained from the reflective prism 8 is further polarization-split by a polarization beam splitter 11. Then, the thus separated bundles of rays are incident on photosensitive elements 9 and 10, respectively. The photosensitive element 10 is the same as that described with reference to FIG. 1A and therefore outputs the light-reception signals C and D. The photosensitive element 11 comprises one having a single light-reception surface and outputs the output signal E.

The focusing-error signal and tracking-error signal are formed, similarly to the case of FIG. 1A, of the signal (A–B) and the signal (C–D), respectively. However, the data signal is formed of [(C+D)–E].

For the sake of clear indication of the signals A, B, C, D and E as output signals, these letters are enclosed in brackets in FIGS. 1A and 1B.

In the optical pick-up systems shown in FIGS. 1A and 1B, the focusing control is carried out using the knife-edge method. However, there occurs no light loss such as described because the reflective prism 8 acts as the knife edge member for blocking a part of the bundle of rays converging on the photosensitive element 9. By this construction, the bundle of rays which has been blocked for the photosensitive element 9 is incident on the photosensitive element 10.

However, there may occur other disadvantages in the optical pick-up systems shown in FIGS. 1A and 1B such as follows: The photosensitive elements 9 and 10 for generating the focusing-error signal and the tracking-error signal respectively are disposed at the separate positions as shown in FIG. 1A. As a result, the task of adjustment of the spatial relationship among the photosensitive elements 9, 10 and the reflective prism 8 may be troublesome.

Further, errors may occur in the tracking control due to aging of the optical pick-up system. This is because, for reasons such as vibration applied to the system, the disposed posture of the reflective prism, for example may be slightly altered. Even such slight posture variation of the reflective prism results in considerable deflection of the reflected light.

Further, another example of an optical pick-up system for detecting the focusing error using the knife-edge method will now be described with reference to FIG. 2A indicating essential elements of the optical system.

In FIG. 2A, the bundle of rays emitted from a semiconductor laser element 51 is converted into a parallel bundle of rays by means of a collimating lens 52. Then, the thus converted parallel bundle of rays is transmitted by a separating surface 53a of a beam splitter 53 and then is incident on an objective lens 54. The incident bundle of rays is then made to converge on a recording surface of an optical disc 55 by means of the objective lens 54.

On the other hand, the reflection light reflected by the recording surface of the optical disc 55 is reflected by the division surface 53a of the beam splitter 53. Then, the light thus reflected by the separating surface 53a is incident on a detective lens 56 so as to be made converge. Almost all of the bundle of rays which has been transmitted by the detective lens 56 (referred to as detection bundle of rays, hereinafter) is reflected by a knife edge prism 57. The reflected light is then received by a dual-surface photosensitive element 58. On the other hand, the remaining part of the detection light which has not been reflected by the knife edge prism 57 is received by a dual-surface photosensitive element 59.

There, the light-reception surface of the dual-surface photosensitive element 58 is divided into two parts so that the division line extends in the direction in which the recording tracks (not shown in the drawing) extend on the recording surface of the optical disc 55 as shown in FIG. 2B. On the other hand, the light-reception surface of the dual-surface photosensitive element 59 is divided into two parts so that the division line extends in the direction of the ridgeline 57a of the knife edge prism extends as shown in FIG. 2C.

In the optical system shown in FIG. 2A, the dual-surface photosensitive element 59 is disposed at the focal point A of the detective bundle of rays converged by the detective lens 56 in a condition where the laser beam is focused on the recording surface of the optical disc 55, as shown by solid lines in FIG. 3A. There, the knife edge 60 indicates the knife edge effect of the knife edge prism 57.

Therefore, in the focused state, the spot of the detective flux formed on the light-reception surface of the dual-surface photosensitive element 59 is made to be one such as the spot SPa indicated in FIG. 3B by a solid line. In this state, the two areas, of the spot SPa, formed on the respective two light-reception surfaces of the dual-surface photosensitive element 9 are equal.

On the other hand, as shown by broken lines in FIG. 3A, there may be a case where the laser beam is slightly defocused on the recording surface of the optical disc 55. In such a case, the spot of the detection bundle of rays (the focal point is at the point B) formed on the light-reception surface of the dual-surface photosensitive element 59 is made, through the detective lens 56, to be one such as the spot SPb shown by a broken line in FIG. 3B. Therefore, in this state, the two areas, of the spot SPa, formed on the respective two light-reception surfaces of the dual-surface photosensitive element 9 are such that one is larger than the other. Such area biassing depends on the relevant defocusing direction.

Then, if the laser beam is further defocused, the spot of the detection bundle of rays, converging on the light-reflection surface of the dual-surface photosensitive element 59 due to the detective lens 56, is made to be one such as the spot SPc shown by a chain double dashed line in FIG. 3B.

Thus, it is possible to detect a focusing error of the objective lens 54 for the recording surface of the optical disc 55, based on the difference between the light-reception signals obtained from the respective two light-reception surfaces of the dual-surface photosensitive element 59. The knife-edge method such as described above may be widely used as a focusing-error detecting method having high sensitivity but a simple construction.

In the system shown in FIG. 3A, it is desired to reduce the diameter of the laser spot to be formed on a recording surface of the optical disc 55 so that the data recording density for the optical disc 55 may be improved. In order to reduce the diameter of the laser spot, it may be required to use a lens having a so-called high numerical aperture (abbreviated to be NA, hereinafter) property as the objective lens 55, such that the NA is more than 0.5.

However, if such a high NA objective lens is used in an optical pick-up system using the knife-edge method, the sensitivity in the focusing-error detection becomes too high, the focus range becoming thus extremely narrow.

In order to eliminate such a problem, the following counter measures may be considered:

a) To increase the focal length of the objective lens;

b) to shorten the focal length of the detective lens; and c) to increase the blocking ratio of the knife edge 10. However, the following problems occur for the above measures:

a) If the NA is to remain unchanged, the incident beam diameter must be enlarged and thus the system must be scaled up;

b) the spot formed on the light-reception surface of the dual-surface photosensitive element 59 is reduced and as a result positioning adjustment of the dual-surface photosensitive element 59 becomes difficult and also the system becomes vulnerable to variations in the positions due to aging; and c) the quantity/intensity of the detection bundle of rays incident on the dual-surface photosensitive element 59 is reduced and as a result the system is liable to be adversely affected by flare light and/or noise.

Further, the track-crossing-noise in the focusing-error signal becomes remarkable if a high NA objective lens is used, which noise seldom occurs when a low NA objective lens is used. As a result, loss of focus may occur during a so-called direct seeking operation in which the number of recording tracks which have been crossed is detected using the wave form of the tracking-error signal.

Such track-crossing-noise occurs as follows:

First, the amount of light reflected from the disc surface (detection light amount) differs between the cases where the spot position is in a groove and on a land (non-groove). Further, the shape of the reflected wave front (the wavefront shape of the detection bundle of rays) also differs between the cases of groove and land. The larger the NA of the objective is made to be, the larger such variation in the light amount and variation in the wavefront shape become.

As a result, in the knife-edge method in which a part of the detection bundle of rays is received at the detective-lens light-converging point, the following phenomena occurs. The focus spot is made to be a very small diffraction spot and the spot position varies due to the intensity of the detection bundle of rays or the wavefront shape. As a result, quivering occurs in the focusing-error signal. As an example of this quivering, when the intensity of the bundle of rays increases, the spot SPa of FIG. 3B slightly moves. The shorter the focal length of the detective lens becomes, the greater this spot-position movement becomes.

SUMMARY OF THE INVENTION

A general object of the present invention is to provide an optical pick-up system which has a construction enabling one photosensitive element to simultaneously act as two different photosensitive elements for generating the focusing-error signal and for generating the tracking-error signal respectively.

A first particular object of the present invention is to provide an optical pick-up system which eliminates the adjustment procedures associated with the knife edge and/or the roof prism and to enable cost savings and reduction in size thereof.

In order to achieve the above first object of the present invention, an optical pick-up system according to a first aspect of the present invention comprises:

a light source for emitting light;

an objective lens for causing light emitted from said light source be converge onto an optical recording medium;

a beam splitter for separating light reflected from said optical recording medium from the bundle of rays emitted from said light source;

a detective lens for causing said light separated by means of said beam splitter to be converge; and a detective photosensitive element disposed at a position at which the light converged by means of said detective lens approximately converges;

and wherein:

said detective lens has first and second surfaces;

said first surface opposes said beam splitter and is formed to be convex so as to cause the bundle of rays; and a second surface is made to have a shape to enable said detective photosensitive element to simultaneously act as two different photosensitive elements for generating the focusing-error signal and for generating the tracking-error signal respectively.

In this construction, the detective lens, comprising only one optical element, acts as the knife edge as well as the fundamental detective lens. As a result, the positioning-adjustment procedure associated with the knife edge can be eliminated. Further, since the number of elements constituting the system may be reduced, the cost required for the entire system may be reduced and also the size of the system may be reduced. Further, from another view point, it can be said that the above construction enables the detective lens, comprising only one optical element, to act as the roof prism as well as the fundamental detective lens. As a result, similarly to the above-described case, the positioning-adjustment procedure associated with the roof prism can be eliminated. Further, since the number of elements constituting the system may be reduced, the cost required for the entire system may be reduced and also the size of the system may be reduced.

A second particular object of the present invention is to provide a novel optical pick-up system that allows focusing control using the knife-edge method without light-amount loss, the optical pick-up system also not being susceptible to errors due to aging.

In order to achieve the above second particular object of the present invention, an optical pick-up system according to a second aspect of the present invention comprises an optical pick-up system for focusing control using the knife-edge method. A transparent plate is disposed in the part of a converging bundle of rays separated from the path of light emitted from a light source and arriving at an optical disc so that a part of said converging bundle of rays is incident on said transparent plate, said converging bundle of rays having been reflected by the recording surface of said optical disc, and said transparent plate having a straight edge part;

a first dual-surface photosensitive element on which the bundle of rays, after being transmitted by said transparent plate, is incident; and a second dual-surface photosensitive element on which the bundle of rays, which is converged without being incident on said transparent plate, is incident.

The above two surfaces of said transparent plate may be parallel; and also said transparent plate may be disposed obliquely to the incident direction of said converging bundle of rays.

Alternatively, the two surfaces of said transparent plate may be non-parallel; and also said transparent plate may have a wedge-shaped lateral cross-section.

Alternatively, a polarization splitting layer may be provided on the incident surface of said transparent plate; and also said optical pick-up system may be arranged so that the bundle of rays reflected by said polarization splitting layer is made to be incident on a third photosensitive element. This construction may be used for the case where the optical information recording medium comprises a magneto-optical disc. The above polarization splitting layer may be formed on the above incident surface by a vacuum evaporation method, for example.

Further, it is preferable that:

$$\Theta_1 > \alpha > \Theta_2;$$

where: $\alpha$ is an angle formed between the side end surface on said straight edge part and the normal to the incident surface of said transparent plate;

$\Theta_1$ is the incidence angle of the light incident on said straight edge part; and $\Theta_2$ is the reflection angle of said light incident on said straight edge part.

Further, one of said first and second dual-surface photosensitive elements is used for generating a tracking-error signal and the other is used for generating a focusing-error signal; and either said first and second dual-surface photosensitive elements may be constructed as a single unit, or may be constructed as respective separate units.

In the optical pick-up system according to the second aspect of the present invention, the transparent plate acts as the knife edge member. The respective bundles of rays transmitted by and not transmitted by the transparent plate are used for generating the focusing-error signal and used for generating the tracking-error signal. The two bundles of rays have approximate same direction as described below.

Further, provision of the polarization splitting layer on the incident surface of the transparent plate as described above enables the transparent plate acting as the knife edge member to also act as polarization splitting means for the bundle of rays. Such polarization splitting means is required for reproducing the information previously recorded by means of the magneto-optical recording method.

A third particular object of the present invention is to provide an optical pick-up system that is capable using a high NA objective lens, for properly forming the focusing-error signal.

In order to achieve the above third particular object, an optical pick-up system according to a third aspect of the present invention comprises:

a light source for emitting light;

an objective lens for converging the bundle of rays emitted from said light source on an optical recording medium;

a beam splitter for separating the light, reflected by said optical recording medium, from said bundle of rays emitted from said light source; and a detective optical system for introducing the separated reflected light thereto as detective light, said detective optical system then forming various signals; and wherein said detective optical system comprises:

means for separating a part of the bundle of rays of said detective light so that the separated part of the bundle of rays has a belt shape;

means for converging either the bundle of rays either before or after being split by means of said bundle-of-rays splitting means; and a dual-surface photosensitive element, a light-reception surface of which has a division oriented in a predetermined direction, for receiving the bundle of rays obtained as a result of being slit and converged by the respective means;

and wherein said optical pick-up system detects the focal error of said objective lens, using the difference between the respective light-reception signals output from the two light-reception surfaces of said dual-surface photosensitive element.

The focusing-error signal is obtained from the bundle of rays separated from the detective bundle of rays which has been split by means of the above beam splitter. By this construction, it is possible to obtain the focusing-error signal having a desired detection sensitivity using the knife-edge method even if a high NA objective lens is used.

Other objects and further features of the present invention will become more apparent from the following detailed description when read in conjunction with the accompanying drawings.

BRIEF DESCRIPTION OF THE DRAWINGS

FIGS. 1A, 1B, 1C, 1D, 1E and 1F show an optical pick-up system in the related art;

FIGS. 5A, 5B, 5C and 5D show a composite detective lens and a detective photosensitive element used in the optical pick-up system of FIG. 4;

FIG. 5E shows a composite detective lens resulting from modifying the composite detective lens of FIG. 5C and also one used in a second embodiment of the optical pick-up system according to the present invention;

FIG. 8 shows essential elements of an optical pick-up system in a fifth embodiment of the optical pick-up system according to the present invention;

FIGS. 9A and 9B show a composite detective lens and a detective photosensitive element in the optical pick-up system of FIG. 8;

FIG. 9C shows a composite detective lens resulting from modifying the composite detective lens of FIG. 9A and also one used in a sixth embodiment of the pick-up system according to the present invention;

FIGS. 12A, 12B and 12C show characteristic parts of a transparent plate in a ninth embodiment of the optical pick-up system according to the present invention;

FIGS. 14A and 14B show essential elements of an optical system in an optical pick-up system in a eleventh embodiment according to the present invention;

FIG. 15 is a diagram illustrating the function of a transmitting triangle prism of FIG. 14A;

FIGS. 16A and 16B are model diagrams illustrating the effect of the system of FIG. 14A;

FIGS. 17A and 17B show essential elements of an optical system in an optical pick-up system in a twelfth embodiment according to the present invention;

FIGS. 18A and 18B are diagrams illustrating the function of the system of FIG. 17A;

FIGS. 19A and 19B show essential elements of an optical system in an optical pick-up system in a thirteenth embodiment according to the present invention;

FIGS. 20A and 20B are diagrams illustrating the function of the system of FIG. 19A;

DESCRIPTION OF THE PREFERRED EMBODIMENTS

An optical pick-up system in a first embodiment of the present invention will now be described with reference to FIG. 4. This optical pick-up system detects the focusing error using the knife-edge method.

Figure 4:
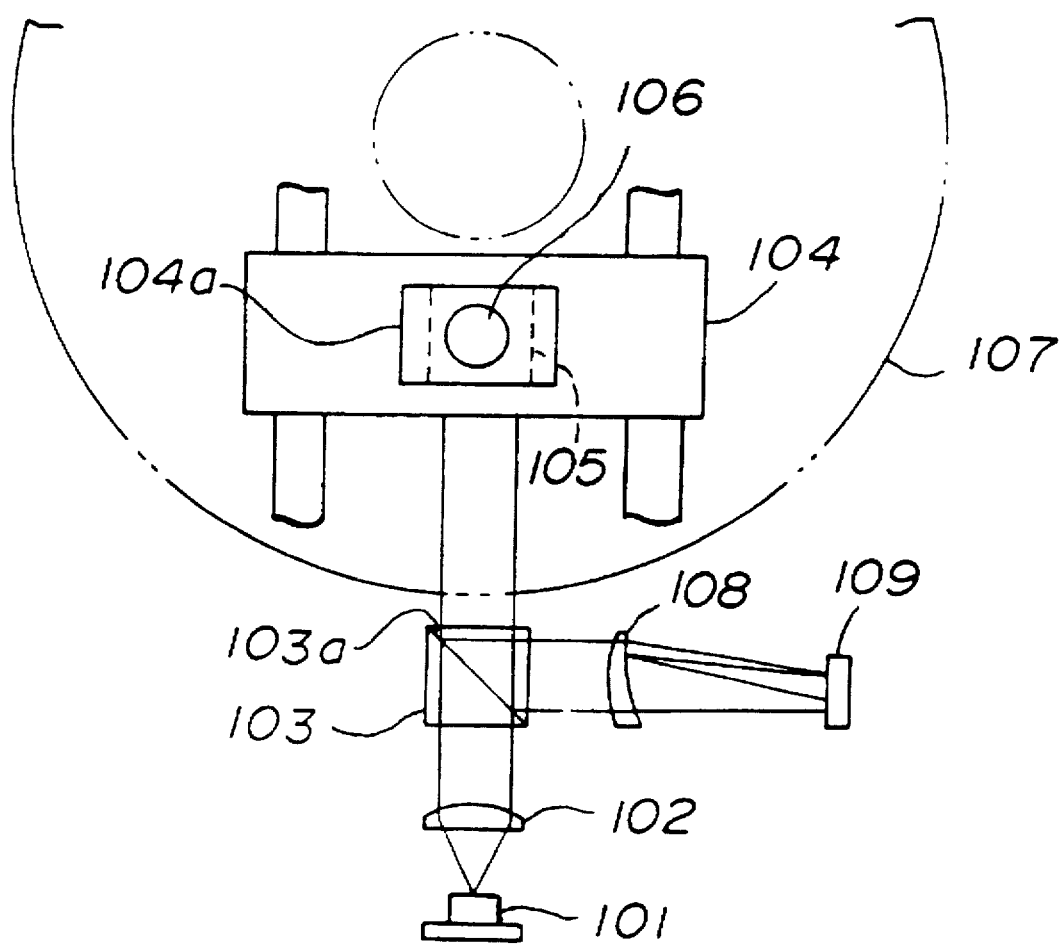
FIG. 4 shows essential elements of an optical pick-up system in a first embodiment of the optical pick-up system according to the present invention.

In FIG. 4, the bundle of rays emitted from a semiconductor laser element 101 is made the parallel by means of collimating lens 102. Then, the parallel bundle of rays is transmitted by the division surface 103a of a beam splitter 103. The transmitted bundle of rays is polarized to a direction perpendicular to the plane of FIG. 4 by means of a polarization prism 105 provided on a carriage 104. The polarized bundle of rays converges on the recording surface of an optical disc 107. The carriage 104 is provided with a seeking mechanism for in back-and-forth moving the carriage back and forth 104 in the direction in which a radius of the optical disc 107 extends. An objective-lens moving mechanism 104a has a function of moving the objective lens 106 at least in the focusing direction.

On the other hand, the light reflected by the recording surface of the optical disc 107 is polarized by the polarization prism 105 toward the light source. The thus polarized light is reflected by the division surface 103a of the beam splitter 103 and then is incident on a composite lens 108.

The composite lens 108 has the following construction, as shown in FIGS. 5A, 5B and 5C. The lens 108 comprises a plane-and convex lens 108a and a triangular prism 108c where the ridgeline 108ca of the triangular prism 108c is located a length L from the top end part 108aa of the plane-and-convex lens 108a toward the center of the lens, on the plane surface of 108a. Thus, the plane-and-convex lens 108a and the triangular prism 108c are formed to be a unit body.

By this construction, the partial bundle of rays LPa of the detection bundle of rays LP incident on the composite detective lens 108 converges at the convergence point P1 of the plane-and-convex lens 108a. The above partial bundle of rays LPa is one which passes through the part, of the composite detective lens 108, lying between the top end part 108aa and the ridgeline 108ca. On the other hand, the partial bundle of rays LPb which passes through the triangle prism 108c is refracted at the oblique-edge surface 108cb of the triangle prism 108c. The thus refracted bundle of rays converges at a convergence point (focal point) P2 further then the convergence point (focal point) P1.

A detective photosensitive element 109 which receives the detection bundle of rays LP is disposed so that the light-reception surface thereof is located so as to include the focal point P1. A split light-reception surface 109a for receiving the bundle of rays LPa and another split light-reception surface 109b for receiving the bundle of rays LPb are formed on the detective photosensitive element 109. The split light-reception surface 109a is divided into two areas so that each of the divided areas may receive a respective one of two primary diffracted light beams LO1 and LO2 appearing in the detection bundle of rays LP. On the other hand, the split light-reception surface 109b is divided so that the division direction is perpendicular to the division direction in the split light-reception surface 109a.

By this construction, it is possible to form a focusing-error signal concerning the objective lens 106 by calculating the difference between the respective light-reception signals output from the two light-reception areas of the split light-reception surface 109a. It is also possible to form a tracking-error signal concerning the objective lens 106 by calculating the difference between the respective light-reception signals output from the two light-reception areas of the split light-reception surface 109b.

Thus, it is possible to implement the focusing-error detecting operation, using the knife-edge method, similar to the conventional one for the following reason: The ridgeline 108ca, of the triangle prism 108c of the composite detective lens 108, acts as the ridgeline of the knife edge in the knife-edge method.

Further, in the optical pick-up system in the first embodiment of the present invention, the directions of the bundles of rays LPa and LPb are identical where the detection bundle of rays LP is split into the bundles of rays LPa and LPb for detecting the focusing-error signal and the tracking-error signal. This style enables both the split light-reception surfaces 109a and 109b for the focusing-error signal detection and tracking-error signal detection to be formed on the one photosensitive element 109. Therefore, it is enabled that the one photosensitive element 109 acts to provide both the focusing error and tracking error signals. Thus, it is possible to reduce the number of elements constituting the optical pick-up system.

Further, since the two division lines of the split light-reception surfaces 109a and 109b are perpendicular to one another, it is possible to adjust each of the focusing-error detection condition and tracking-error detection condition independently. Further, since the convergence point P2 of the bundle of rays LPb is located further than the location the convergence point P1 of the bundle of rays LPb, the resulting spot of the bundle of rays LPb is larger than that of the bundle of rays LPa where the two bundles of rays are received at the same position. As a result, the task of adjusting the tracking error may be simplified.

Further, since the composite detective lens 108 has the knife-edge function, the task of adjusting the light-blocking ratio, for the bundle of rays, provided by the knife-edge becomes unnecessary. Thus, task of adjustment of the optical pick-up system becomes easier, accordingly. Further, in the above-described optical pick-up system, there is no variation in the adjusted state of the knife edge due to aging, in principle. Such variation may occur due to vibration applied to the optical pick-up system, for example. As a result, more reliable operation of the system may result. Further, since there is no necessity to provide an element to act as the knife edge other than that already included in the composite lens 108, the number of the elements constituting the system may be reduced, thus the cost of the system may be reduced and also it is possible to miniaturize the system.

Another form for the composite detective lens 108$^P$ will now be described with reference to FIG. 5E. The lens 108$^P$ comprises a convex lens 108$^P$a and a trapezoidal prism 108$^P$b. The two elements 108$^P$a and 108$^P$b are constructed as a single unit. The trapezoidal prism 108$^P$b comprises two planes as shown in FIG. 5E: the first plane is perpendicular to the center axis of the convex lens 108$^P$a and the second plane is oblique to this center axis. The line of intersection of the above two planes does not intersect the above center axis of the convex lens 108$^P$a.

An optical pick-up system in a third embodiment of the present invention will now be described with reference to FIG. 6A. Here, only characteristic elements specific to this system will be described and the description of the elements substantially identical to those shown in FIG. 4 will be omitted. The same reference numerals are designated for these substantially identical elements.

Figure 6A:
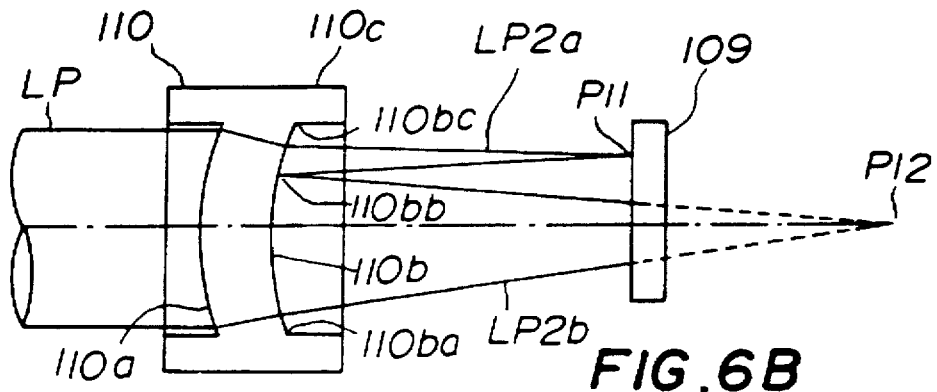
FIGS. 6A and 6B show a composite detective lens and a detective photosensitive element used in a third embodiment of the optical pick-up system according to the present invention.

In FIG. 6A, a composite detective lens 110 is provided with an incident surface 110a on which the detection bundle of rays LP is incident and an exit surface 110b from which the thus incident bundle of rays exits the lens 110. As shown in FIG. 6A, the incident surface comprises a projecting spherical surface (or a projecting non-spherically curved surface). The exit surface 110b comprises an approximately concave surface. Further, the approximately concave surface exit surface 110b comprises two areas: A first area comprises a concave sphere (or a concave non-spherically curved surface) and a second area comprises a plane. The above first area lies between the bottom end position 110ba and a position 110bb located slightly higher than the height of the lens center. The above second area lies between the above position 110bb and the top end position 110bc. The plane of the second area is perpendicular to the plane of FIG. 6A and also slightly oblique (by several degrees) to the vertical direction in FIG. 6A.

By this construction, the partial bundle of rays LP2a of the detection bundle of rays LP incident on the composite detective lens 110 is refracted at the exit surface 110b and then converges at a convergence point P11 according to the radius of curvature of the incident surface 110a. The partial bundle of rays LP2a is one which is transmitted by the part, of the composite detective lens 110, lying between the position 110bb and the position 110bc. On the other hand, the partial bundle of rays LP2b which is transmitted by the part, of the composite detective lens 110, lying between the position 110ba and the position 110bb converges at a convergence point P12 according to the radiuses of curvature of both the incident surface 110a and the exit surface 110b.

There, since the exit surface comprises a diverging surface, the convergence point P12 is located further from the lens than the convergence point P11.

Figure 6B:
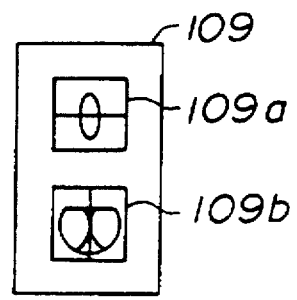

If the light-reception surface of the photosensitive element 109 is positioned so as to include the convergence point P11, as shown in FIG. 6B, the spot of the bundle of rays LP2b formed on the split light-reception surface 109b is larger than the spot of the bundle of rays LP2a formed on the split light-reception surface 109a.

Further, the composite detective lens 110 of FIG. 6A is provided with a supporting portion 110c having a cylindrical shape with a diameter larger than that of the detective bundle of rays LP. The supporting portion 110c is formed so that the resulting composite detective lens 110, being a single unit, includes the supporting portion 110c integrated thereinto as shown in FIG. 6A.

It is possible to arbitrary determine the sizes of the two spots formed on the detective photosensitive element 109. Therefore, positioning-adjustment of the split light-reception surfaces 109a and 109b of the detective photosensitive element 109 is straightforward.

An optical pick-up system in a fourth embodiment of the present invention will now be described with reference to FIG. 7A. Here, only characteristic elements specific to this system will be described and the description of the elements substantially identical to those shown in FIG. 4 will be omitted. The same reference numerals are designated for these substantially identical elements.

Figure 7A:
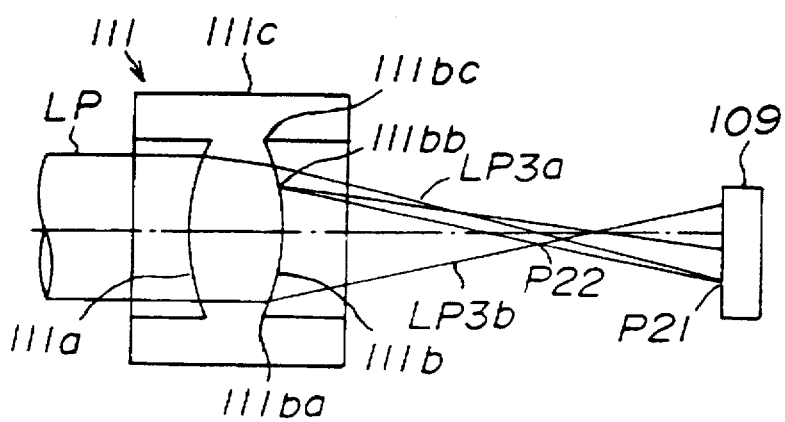
FIGS. 7A and 7B show a composite detective lens and a detective photosensitive element used in a fourth embodiment of the optical pick-up system according to the present invention.

In FIG. 7A, a composite detective lens 111 is provided with an incident surface 111a on which the detection bundle of rays LP is incident and an exit surface 111b from which the thus incident bundle of rays exits the lens 111. As shown in FIG. 6A, the incident surface comprises a projecting spherical surface (or a projecting non-spherically curved surface). The exit surface 111b comprises an approximately convex surface. Further, the approximately convex surface exit surface 111b comprises two areas: A first area comprises a projecting sphere (or a projecting non-spherically curved surface) and a second area comprises a plane. The above first area lies between the bottom end position 111ba and a position 111bb located slightly higher than the height of the lens center. The above second area lies between the above position 111bb and the top end position 111bc. The plane of the second area is perpendicular to the plane of FIG. 6A and also slightly oblique (by several degrees) to the vertical direction in FIG. 6A.

By this construction, the partial bundle of rays LP3a of the detection bundle of rays LP incident on the composite detective lens 111 is refracted at the exit surface 111b and then converges at a convergence point P21 according to the radius of curvature of the incident surface 111a. The partial bundle of rays LP3a is one which is transmitted by the part, of the composite detective lens 111, lying between the position 111bb and the position 111bc. On the other hand, the partial bundle of rays LP3b which is transmitted by the part, of the composite detective lens 111, lying between the position 111ba and the position 111bb converges at a convergence point P22 according to the radiuses of curvature of both the incident surface 111a and the exit surface 111b.

There, since the exit surface comprises a converging surface, the convergence point P22 is located nearer to the lens than the convergence point P21.

Figure 7B:
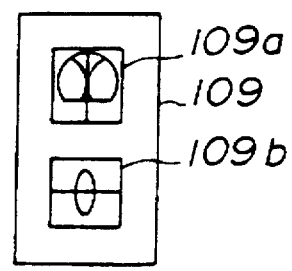

If the light-reception surface of the photosensitive element 109 is positioned so as to include the convergence point P21, since the converged bundles of rays LP3a and LP3b cross one another, the spot of the bundle of rays LP3b is formed on the split light-reception surface 109a and the spot of the bundle of rays LP2a is formed-on the split light-reception surface 109b as shown in FIG. 7B. The spot of the bundle of rays LP3b is larger than the spot of the bundle of rays LP2a.

Further, similarly to the case of FIG. 6A, the composite detective lens 111 of FIG. 7A is also provided with a supporting portion 111c having a cylindrical shape with a diameter larger than that of the detective bundle of rays LP.

An optical pick-up system in a fifth embodiment of the present invention will now be described with reference to FIG. 8. The optical pick-up system in the fifth embodiment uses the Faucault method for detecting the focusing error. Here, the same reference numerals are designated for elements substantially identical to those in FIG. 4, respectively.

In FIG. 8, the light reflected from the recording surface of the optical disc 107 is polarized by the polarization prism 105 and then reflected by the division surface 103a of the beam splitter 103 so as to be incident on a composite detective lens 115.

The composite detective lens 115 comprises, as shown in FIG. 9A, a plane-and-convex lens 115a and a roof prism 115b in contact with the plane of the plane-and-convex lens 115a. Thus, the plane-and-convex lens and roof prism 115b form a single unit.

A partial bundle of rays LP4a of the detection bundle of rays LP incident on the composite detective lens 115 is refracted at an oblique-edge surface 115ba and then converged at a convergence point P31. The above partial bundle of rays LP4a is one which is transmitted by the above oblique-edge 115ba of the roof prism 115b. On the other hand, a partial bundle of rays LP4b transmitted by an oblique-edge surface 115bb of the roof prism 115b is refracted at this oblique-edge surface 115bb and then converged at a convergence point P32.

The bundles of rays LP4a and LP4b which have been transmitted by the composite detective lens 115 cross one another. Further, the two convergence points P31 and P32 are located at the same distance from the composite detective lens 115. The light-reception surface of a detective photosensitive element 116, which is to receive the detective bundle of rays LP, is located so as to include the convergence points P31 and P32. As shown in FIG. 9B, a split light-reception surface 116a for receiving the bundle of rays LP4b and a split light-reception surface 116b for receiving the bundle of rays LP4a are formed on the detective photosensitive element 116.

By this construction, the focusing-error signal for the objective lens 105 may be produced by the following procedure: The respective light-reception signals output by the upper light-reception area of the split light-reception surface 116a and the lower light-reception area of the split light-reception surface 116b are added to one another. Thus, a first added signal is obtained. Further, the respective light-reception signals output by the lower light-reception area of the split light-reception surface 116a and the upper light-reception area of the split light-reception surface 116b are added to one another. Thus, a second added signal is obtained. Then, the difference between the above first and second added signals is calculated. Thus, the relevant focusing-error signal is obtained.

In this case, the tracking-error signal may be obtained by the following method, for example: Wobbled marks formed on an optical disc are detected and the corresponding detection signal is obtained. The thus obtained detection signal is used to obtain the relevant tracking-error signal.

Alternatively, the following method may be also used to produce the tracking-error signal: The detection bundle of rays LP is further split and the thus obtained bundle of rays is used to produce the relevant tracking-error signal.

(The above wobbled marks is used in the wobbled mark method. With regard to this method, see DRAFT PROPOSAL, ISO/DP9171-2(5th DP), Information processing systems-Optical digital data disc-ISO/TC 97/SC23N179, 1987, and/or the optical memory symposium, '86 paper collection, 'Error samples in intermittent servo and continuous servo systems in optical data disc', PP.133–138, by Tuyoshi, Otake, and Yonezawa (December, 1986).)

Thus, in the optical pick-up system in the fifth embodiment of the present invention, the composite detective lens 115 is made to have the function of the roof prism in addition to the fundamental function of the detective lens. As a result, the positioning-adjustment work particular to the roof prism is eliminated, the adjustment of the optical pick-up system being thus simplified. Further, in the above-described optical pick-up system, there is no variation in the adjusted state of the roof prism due to aging, in principle. Such variation may occur due to vibration applied to the optical pick-up system, for example. As a result, more reliable operation of the system may result. Further, since there is no necessity to provide a roof prism other than that already included in the composite lens 115, the number of the elements constituting the system may be reduced, thus the cost of the system may be reduced and also it is possible to miniaturize the system.

Another form of the composite detective lens $115^P$ will now be described with reference to FIG. 9C. The lens $115^P$ comprises a convex lens $115^Pa$ and a cut-out prism $115^Pb$. The two elements $115^Pa$ and $115^Pb$ are formed as a single unit. The cut-out prism $115^Pb$ comprises two planes as shown in FIG. 9C: The respective two planes are oblique to a plane perpendicular to the center axis of the convex lens $115^Pa$. The edge of intersection of the above two planes intersects with the above center axis of the convex lens $115^Pa$.

Further, even though the present invention has been applied to the optical pick-up system in the optical disc device in the above embodiments, it is not necessary to limit the application of the present invention so. It is also possible to similarly apply the present invention to another kind of an optical pick-up system using the knife-edge method and/or the Faucault method.

Figure 10A:
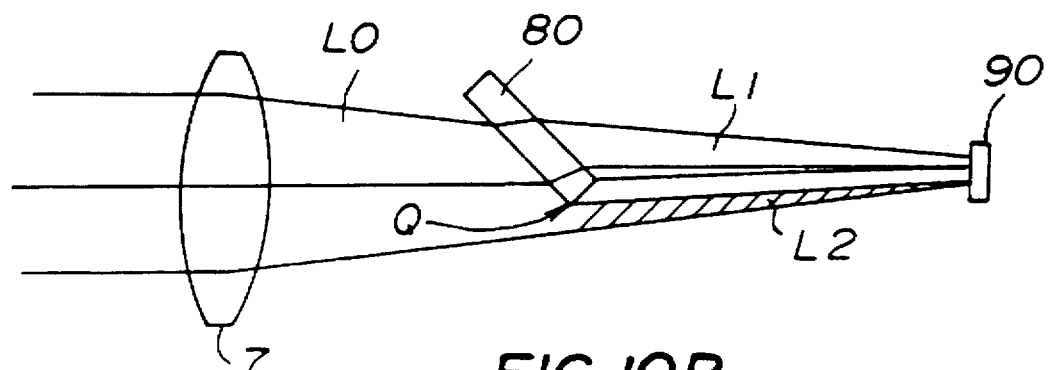
FIGS. 10A and 10B show essential elements of an optical pick-up system in a seventh embodiment according to the present invention.

An optical pick-up system in a seventh embodiment of the present invention will be described with reference to FIG. 10A, indicating only essential elements of the system. This optical pick-up system results from applying the present invention to the optical pick-up system shown in FIG. 1A. FIG. 10A shows an optical-system arrangement in the light path of the bundle of rays which has been reflected by the recording surface of the optical disc and then separated from the light path starting from the light source and arriving at the optical disc. The optical-system arrangement starting from the light source and arriving at the recording surface of the optical disc is similar to that shown in FIG. 1A.

The bundle of rays reflected by the recording surface of the optical disc and then separated from the light path starting from the light source and arriving at the optical disc is converted into the bundle of rays L0 having a converging tendency, by means of the detective lens 7. A transparent plate 80 acting as the knife edge member is disposed in the path of the converging bundle of rays L0.

The transparent plate 80 comprises a parallel-plane plate and is disposed obliquely to the advancing direction of the converging bundle of rays L0. Further, the transparent plate 80 is disposed so that a part of the converging bundle of rays L0 is incident thereon. A ridgeline part Q of the transparent plate 80 extends along the direction perpendicular to the plane of FIG. 10A. This ridgeline part Q acts as the knife edge.

The bundle of rays L1 transmitted by the transparent plate 80 is then separated, due to the refraction by the transparent plate, vertically in FIG. 10A from the bundle of rays L2 which is not transmitted by the transparent plate 80. Due to the function of the above refraction, the convergence point of the bundle of rays L1 is located further (to the right in FIG. 10A) from the detective lens 7 than the location of the convergence point of the bundle of rays L2.

Figure 10B:
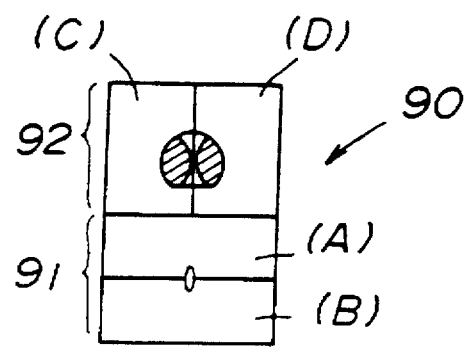

The bundles of rays L1 and L2 are respectively incident on a photosensitive element 90. The photosensitive element 90 is provided, as shown in FIG. 10B, with two dual-surface photosensitive elements 91 and 92. These photosensitive elements 91 and 92 are formed as a single unit. The photosensitive element 91 outputs light-reception signals (A) and (B) and is used for providing the focusing-error signal. The photosensitive element 92 outputs light-reception signal signals (C) and (D) and is used to provide the tracking-error signal. When the light spot is focused on the recording surface of the optical disc, the bundle of rays L2 converges on the division line of the light-reception surface of the photosensitive element 91. On the other hand, since the convergence point of the bundle of rays L1 is located further away than the convergence point of the bundle of rays L2, a cross-sectional image of the bundle of rays L1 is positioned on the light-reception surface of the photosensitive element 92. There, the bundle-of-rays occurs at an intermediate along the path of the converging bundle of rays L2.

Thus, the two photosensitive elements 91 and 92 for the focusing-error-signal generation and tracking-error-signal generation can be constructed in a single unit as the photosensitive element 90. As a result, the positioning-adjustment of the photosensitive element is straightforward and also only a small space is required for the provision of the photosensitive element. The relevant data signal can be produced by signal summation namely: (A+B+C+D).

In comparison with the optical-system arrangement shown in FIG. 1A, the space used for provision of the photosensitive element 10 in FIG. 1A is unnecessary when the construction of FIG. 10A is applied. As a result, it is possible to miniaturize the optical pick-up system accordingly.

Figure 11:
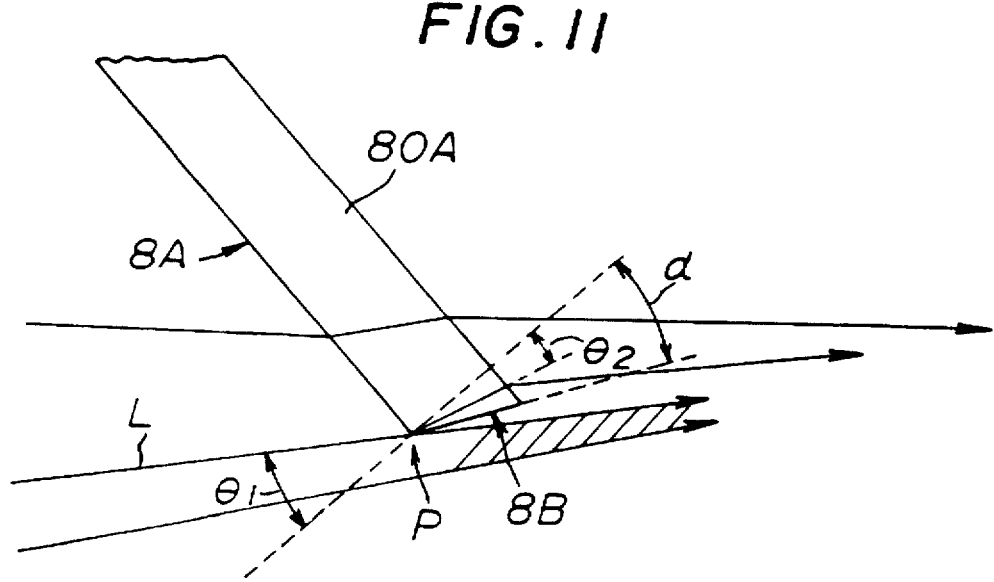
FIG. 11 shows a characteristic part of a transparent plate in an eighth embodiment of the optical pick-up system according to the present invention.

An optical pick-up system in an eighth embodiment of the present invention will be described with reference to FIG. 11.

In the eighth embodiment, the optical-system arrangement on the light path starting from the light source and arriving at the recording surface of the optical disc in this optical pick-up system is similar to the arrangement shown in FIG. 1A. A transparent plate 80A of this optical pick-up system also comprises a parallel plane plate, similar to the parallel plane plate 80 in FIG. 10A, but an end surface 8B is made to be oblique, by an angle $\alpha$ as shown in FIG. 11, to the normal of the bundle-of-rays incident surface 8A of the plate 80A.

In the system of FIG. 10A, the angle corresponding to the angle $\alpha$ is 0. In the system of FIG. 11, there is an optimum value range for the angle $\alpha$. That is, it is preferable to determine the value of $\alpha$ so that $\Theta_1 > \alpha > \Theta_2$. There, as shown in FIG. 11, the symbol $\Theta_1$ refers to the incident angle of the ray L incident on a ridgeline part P, of the transparent plate 80A, constituting the knife edge. The symbol $\Theta_2$ refers to the refraction angle of the ray L. In accordance with the law of refraction, these angles have the following relationship: sin $\Theta_1 = n \cdot \sin \Theta_2$, where the symbol n refers to the refractive index of the transparent plate 80A.

If $\alpha > \Theta_1$, the ridgeline part P does not act as a knife edge and the side end surface 8B acts as a reflecting surface for the incident bundle of rays. As a result, the bundle of rays reflected by the side end surface 8B may become a stray light which may result in noise. If $\alpha < \Theta_2$ (this case corresponds to the case of FIG. 10A), the bundle of rays, once having entered into the transparent plate, may exit through or may be reflected by the side end surface 8B. As a result, the relevant bundle of rays may become a stray light.

If the angle $\alpha$ is in the range such as $\Theta_1 > \alpha > \Theta_2$, such stray light will not be produced. As a result, it is possible to use the entirety of the bundle of rays incident on the transparent plate 80A for the tracking control. That is, light loss does not arise.

An optical pick-up system in a ninth embodiment of the present invention will be described with reference to FIG. 12A. There, the optical-system arrangement on the light path starting from a light source and arriving at the recording surface of the optical disc in this optical pick-up system is similar to the arrangement shown in FIG. 1A.

In the system of FIG. 12A, a transparent plate 81 is not a parallel-plane plate such as described above having an incident surface which is not parallel to the light-exit surface. That is, the cross section of the transparent plate 81 is a wedge-like shape as shown in FIG. 12A. Such a wedge-shaped cross-section causes the light axis of the bundle of rays transmitted by the transparent plate 81 to be oblique to the light axis of the incident bundle of rays. Therefore, adjustment of the wedge angle (the angle formed between the two opposite surfaces: the incident surface and light-exit surface) allows the adjustment of the ratio of light from the bundle of rays transmitted by the transparent plate 81 to that from the bundle of rays by passing the plate 81. As a result, it is possible to make the photosensitive elements 91 and 92 comprise respective separate bodies as shown in FIGS. 12B and 12C.

Further, it is not always necessary to dispose the transparent plate 81, if has such a wedge-shaped cross-section, so that the transparent plate 81 is made oblique to the direction perpendicular to the advancing direction of the converging bundle of rays.

An optical pick-up system in a tenth embodiment of the present invention will be described with reference to FIG. 13A. There, the optical-system arrangement on the light path starting from the light source and arriving at the recording surface of the optical disc in this optical pick-up system is similar to the arrangement shown in FIG. 1A.

Figure 13A:
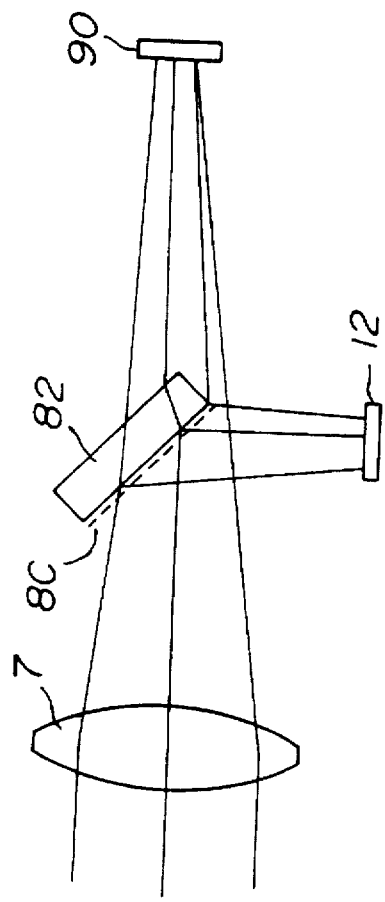
FIGS. 13A, 13B and 13C show characteristic parts of a transparent plate in a tenth embodiment of the optical pick-up system according to the present invention.
Figure 13C:
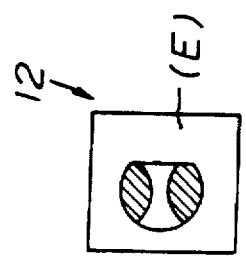
Figure 13B:
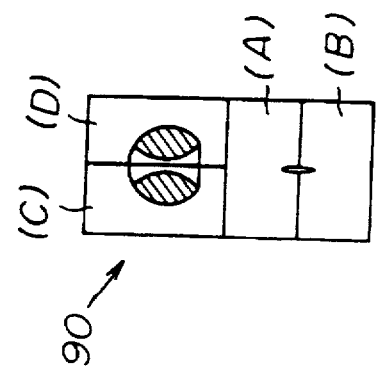

In the system of FIG. 13A, the optical information recording medium comprises an magneto-optical disc. Further, a polarization splitting layer 8C is coated by means of evaporation onto the surface of a transparent plate 82. The coated surface comprises a surface on which the converging bundle of rays is incident. By this construction, when the converging bundle of rays from the detective lens 7 is incident on the transparent plate 82, the relevant bundle of rays will be either transmitted by the plate or reflected from the polarization splitting layer 8c, depending on the direction of polarization of the light. A first portion of the converging bundle of rays, which has been transmitted by the transparent plate 82, and a second portion which has not been transmitted but bypasses it are incident on a photosensitive element 90, similarly to the manner shown in FIG. 10A. The photosensitive element 90 comprises a photosensitive sub-element for the focusing-error-signal generation and another photosensitive sub-element for the tracking-error-signal generation. The two photosensitive sub-elements are integrated in a single unit. Consequently, the bundle of rays incident on the photosensitive element 90 causes the photosensitive element 90 to generate the corresponding focusing-error signal (A–B) and tracking-error signal (C–D).

On the other hand, the bundle of rays reflected by the polarization splitting layer 8C is then incident on a photosensitive element 12, causing the element 12 to generate the light-reception signal E. The relevant data signal is to comprise a difference in light intensities between the two bundles of rays obtained by the splitting by means of the polarization splitting layer 8C. That is, the data signal is obtained by calculation of [(C+D)–E]. As is apparent if the optical-system arrangement of FIG. 13A is compared with that of FIG. 1D, no provision of a separate element corresponding to the polarization beam splitter 11 of FIG. 1D is required in the arrangement of FIG. 13A. This is because the polarization splitting function is performed by the polarization splitting layer 8C which is integrated to transparent plate 82. As a result, the space originally occupied by the polarization beam splitter 11 of FIG. 1D may be used for another purpose.

Although the tracking-error signal is generated using the bundle of rays transmitted by the transparent plate and the focusing-error signal is generated using the bundle of rays bypassing the transparent plate in the above embodiments, it is also possible to make the system so that the focusing-error signal is generated using the bundle of rays transmitted by the transparent plate and the tracking-error signal is generated using the bundle of rays bypassing the transparent plate.

Thus, an aspect of the present invention, which may be implemented by the above optical pick-up systems in the seventh, eighth, ninth, and tenth embodiments of the present invention, enables provision of a novel optical pick-up system as follows: The focusing-error signal and tracking-error signal are generated using the bundle of rays transmitted by the transparent plate and that bypassing the transparent plate there. As a result, although the focusing control is executed using the knife-edge method, no light-amount loss arises. Further, the bundle of rays for the focusing-error-signal generation and that for the tracking-error-signal generation are not obtained as a result of being separated from one another by a reflection operation. As a result, it is possible to prepare respective photosensitive elements for generating the two kinds of error signals so that they are made to be adjacent to one another or made part of the same unit. Therefore, it is possible to make the optical pick-up system compact. Further, a slight variation in the slant angle and/or mounted position of the transparent plate due to aging, if any, does not greatly affect the precise generation of the above error signals. Thus, in comparison to the method in which the respective bundles of rays for generating the two kinds of error signals are obtained as a result of being separated from one another by a reflection operation, undesirable error arising in each error signal may be effectively reduced, which undesirable error may arise due to aging.

An optical pick-up system in an eleventh embodiment of the present invention will be described with reference to FIGS. 14A and 14B. The same reference numerals are designated for elements identical or corresponding to those in FIGS. 2A and 2B.

In the eleventh embodiment, light reflected by the recording surface of the optical disc 55 is then reflected by the division surface 53a of the beam splitter 53. The thus reflected light is then incident on the detective lens 56 so as to become a converging light beam. A transmitting-type triangular prism column 70 is inserted in the part of the bundle of rays transmitted by the detective lens 56 (referred to as detection bundle of rays, hereinafter). The above prism column 70 is used to separate a part of the detection bundle of rays therefrom so that the separated part of the bundle of rays has a belt-shaped cross section. There, a partial bundle of rays La of the detective light, which is incident on the prism column 70, is refracted so as to be guided to advance in a direction different from that of the remaining bundle of rays Lb. The refracted bundle of rays La is received by a split light-reception surface 71a of a detective photosensitive element 71. The above remaining bundle of rays Lb is received by the other split light-reception surface 71b of the detective photosensitive element 71.

As shown in FIG. 14B, the above split light-reception surface 71a is split by a division line parallel to a ridgeline 70a of the above prism column 70. The split light-reception surface 71b is divided so that the division line extends in parallel to the direction in which each of the recording tracks (not shown in the drawing) extends on the optical disc 55.

Figures 3A, 3B:
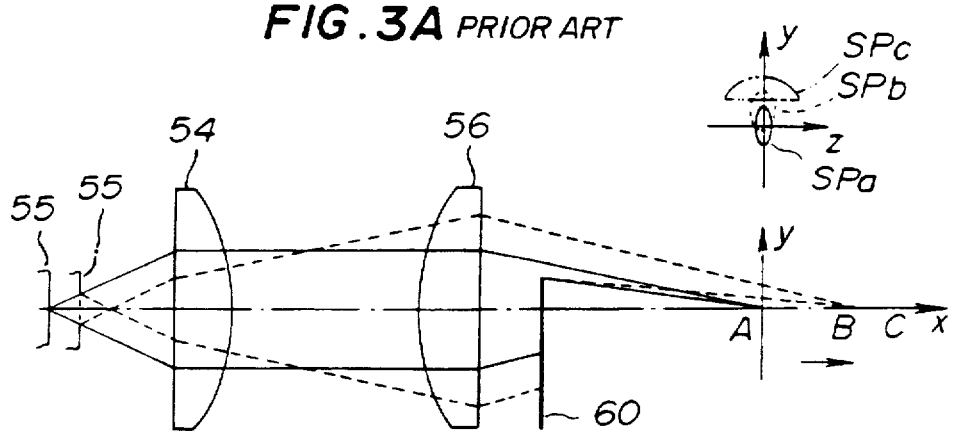
FIGS. 3A and 3B are diagrams illustrating the knife-edge method.

As shown in FIG. 15, the above prism column 70 cuts the bundle of rays La out from the detection bundle of rays so that the cut-out bundle of rays La has a belt-shaped cross section. This function is equivalent to the following function shown in FIG. 16A: The detection bundle of rays is blocked by the knife edge 60 (FIG. 3A is also to be referred to); and a part of the remaining portion, of the detection bundle of rays, not blocked by the knife edge 60, is blocked by another blocking member 61, where the blocking member 61 is parallel to the knife edge 60.

Therefore, it is possible to produce the focusing-error signal on the same principle as the knife-edge method in the related art described above.

In a condition where the laser beam is focused on the recording surface of the optical disc 55, the detective photosensitive element 71 is made to be positioned at the focal point A of the detection bundle of rays converged by the detective lens 56.

By this construction, in the above focused condition, the spot, of the detection bundle of rays, formed on the above split light-reception surface 71a is of the form of spot SPa indicated by a solid line in FIG. 16B. In this state, the areas of the spot SPa thus formed on the two light-reception surfaces of the split light-reception surface 71a are equal to one another.

On the other hand, there may be a case where the laser beam is slightly defocused on the recording surface of the optical disc 55. In this case, the spot formed on the split light-reception surface 71a as a result of the light convergence of the detection bundle of rays (the relevant convergence point is located at a point B) by means of the detective lens 56 is of the form of spot SPb indicated by a broken line in FIG. 16A. In this state, the areas of the spot SPa thus formed on the two light-reception surfaces of the split light-reception surface 71a are different from one another (one is larger than the other). Such biassing depends on the relevant defocusing direction.

If the degree of the above defocusing is increased, the spot of the detection bundle of rays resulting from the light convergence by means of the detective lens 56 onto the split light-reception surface 71a is of the form of spot SPc indicated by a double dashed line in FIG. 16B.

Therefore, it is possible to produce the focusing-error signal by obtaining the difference between the two light-reception signals. These two light-reception signals are obtained from the two light-reception surfaces of the split light-reception surface 71a, respectively. Further, it is also possible to produce the tracking-error signal by obtaining the difference between the two light-reception signals. These two light-reception signals are obtained from the two light-reception surfaces of the split light-reception surface 71b, respectively.

Figures 2A, 2B, 2C:
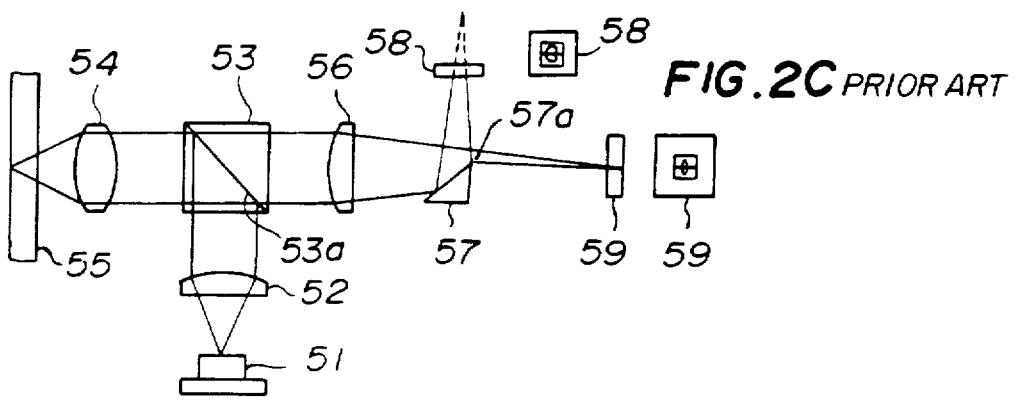
FIGS. 2A, 2B and 2C show an optical pick-up system in the related art.

The spot-position variation behavior in the optical pick-up system of FIGS. 14A, 14B, and 15 will now be compared with the corresponding behavior in the optical pick-up system of FIGS. 2A, 2B and 2C, with reference to FIGS. 3A and 3B and FIGS. 16A and 16B. The above spot-position variation behaviors arise due to the above defocusing conditions. The outer part of the detection bundle of rays is blocked as shown in FIG. 16A in the system of FIGS. 14A, 14B and 15. The above outer part of the bundle of rays varies in advancing direction thereof due to the defocusing greatly in comparison to the inner part of the detection bundle of rays. As a result, the spot-position variation (on the split light-reception surface 71a) due to the defocusing is small in the system of FIGS. 14A, 14B and 15 in comparison to the system of FIGS. 2A, 2B and 2C. That is, it is possible to effectively reduce the detective sensitivity in the focusing-error detection in the system of FIGS. 14A, 14B and 15 in comparison to the system of FIGS. 2A, 2B and 2C. As a result, the focusing range may be widened accordingly.

Further, in the system of FIGS. 14A, 14B and 15, the adjustment of the inserting position of the above prism column 70 and/or the dimensions of the detective lens 56 in the axis direction or width direction results in adjustment of the amount of the outer part of the detection bundle of rays that is blocked, thus enabling adjustment of the focusing-error detective sensitivity to a desired value.

Therefore, in the system of FIGS. 14A, 14B and 15, even if a high-NA lens is used as the objective lens 55, it is possible to effectively set the focusing-error detective sensitivity to appropriate characteristics. Thus, it becomes easier to improve the recording density on the optical disc 55.

Therefore, even if the high-NA lens is used as the objective lens 55, it is not necessary to shorten the focal length of the detective lens 56 so as to reduce the focusing-error detective sensitivity. As a result, it is possible to enlarge the focusing spot to be formed on the detective photosensitive element 71 and thus it is possible to make the positioning-adjustment of the detective photosensitive element 71 easier. Further, it is also possible to make the laser beam diameter small and thus it is possible to miniaturize the relevant optical pick-up system.

Further, it is not necessary to shorten the focal length of the detective lens and also the belt-shaped cross-section bundle of rays La separated by the prism column 70 is approximately vertically incident on the detective photosensitive element. As a result, even if variations in the intensity and/or variations in the wavefront shape of the detection bundle of rays occur when the laser beam crosses the tracks on the recording surface of the optical disc 55, there arises only a small variation in the spot position on the detective photosensitive element 71. Thus, it is possible to control the crossing-track noise in the focusing-error signal and thus it is also possible to implement high-speed and reliable seeking operation of the relevant optical disc device.

Further, in the system of FIGS. 14A, 14B and 15, the respective two bundles of rays La and Lb for the focusing-error detection and for the tracking-error detection have approximately same direction. Thus, it is possible to make the single detective photosensitive element 71 act to detect both the focusing error and tracking error. Thus, the relevant device may be miniaturized. Further, since the entirety of the detection bundle of rays is incident on the detective photosensitive element 71, the detective bundle of rays may be efficiently used.

Although the prism column 70 is disposed at the light exit side of the detective lens 56, it is also possible to dispose the prism column 70 at the incident side of the detective lens 56.

An optical pick-up system in a twelfth embodiment of the present invention will be described with reference to FIGS. 17A and 17B. The same reference numerals are designated for elements identical or corresponding to those in FIGS. 14A and 14B.

In the system of FIG. 17A, the light reflected by the recording surface of the optical disc 55 is reflected by the division surface 53a of the beam splitter 53, then transmitted by a transmission-type parallel plane plate 75, and then incident on the detective lens 56 so as to become converging.

The above plate 75 comprises, as shown in FIGS. 18A and 18B, a part 75aa formed on the incident surface 75a thereof. The part 75aa has a belt shape and is not parallel to the light-exit surface 75b. The part of the detection bundle of rays incident on the part 75aa is refracted thereby and thus separated from the remaining part of the detection bundle of rays. The separated part of the bundle of rays has a belt-shaped cross section accordingly and is incident on the detective lens 56 so as to be converged on and then received by the split light-reception surface 71a of the detective photosensitive element 71.

The above remaining parts Ld and Le of the detection bundle of rays are the parts which are transmitted by the parts, of the plate 75, above the top end and below the bottom end of the part 75aa respectively. Each of the two parts of the plate 75 comprises parallel planes acting as the incident surface and light-exit surface respectively. These remaining parts of the detection bundle of rays are incident on the detective lens 56, then are converged thereby and thus are received by the split light-reception surface 71b of the detective photosensitive element 71, respectively.

In the system of FIG. 17A, a part of the detection bundle of rays is separated so that the thus separated part has a belt-shaped cross section, similarly to the system of FIG. 14A, but the transmission-type parallel plane plate 75 is used in the system of FIG. 17A. Functions and advantages, resulting from the system are similar to those resulting from the system of FIG. 14A.

In the system of FIG. 17A, it is possible to grasp the plate 75 outside the region of the detection bundle of rays. Thus, it is possible to make the relevant assembling work easier and more efficient. Further, simply enlarging the plate 75 in size enables the relevant adjustment task to be made easier and more efficient.

Even though the transmission-type parallel plane plate 75 is disposed at the light exit side of the detective lens 56, it is also possible to dispose the plate 75 at the incident side of the detective lens 56.

An optical pick-up system in a thirteenth embodiment of the present invention will be described with reference to FIGS. 19A and 19B. There, the same reference numerals are designated for elements identical or corresponding to those in FIGS. 14A and 14B.

In FIG. 19A, light reflected by the recording surface of the optical disc 55 is reflected by the division surface 53a of the beam splitter 53, and then incident on the composite detective lens 76 so as to become converging.

There, the composite detective lens 76 includes, as shown in FIGS. 20A and 20B, the light-exit surface comprising an approximate plane. On a light-exit surface, a part 76a lying between the bottom end PA and a position PB located somewhat higher than the center of the light-exit surface comprises a plane perpendicular to the light axis of the incident bundle of rays. Further, a part 76b, lying between the above position PB and a position PC a predetermined length above the position PB, comprises a plane oblique by a slight angle Θ1 to the plane of the part 76a. A part 76c, laid between the above position PC and the top end PD, comprises a plane oblique by an angle Θ2 (>>Θ1) to the plane of the part 76b. Further, the above plane of the part 76c comprises a roughened surface.

By this construction, the bundle of rays Lf transmitted by the part 76a of the lens 76 advances along the original optical axis and then converges onto a split light-reception surface 77a of the detective photosensitive element 77, the surface 77a being one of two such surfaces comprising the element 77.

The bundle of rays Lg transmitted by the part 76b is refracted thereby and then received by the other split light-reception surface 77b of the photosensitive element 77. The bundle of rays incident on the part 76c of the composite detective lens 76 is diffused and thus is not received by the detective photosensitive element 77.

With the above construction, the tracking-error signal may be produced by obtaining the difference between the respective light-reception signals obtained from the two light-reception surfaces of the split light-reception surface 77a. Further, the focusing-error signal may be produced by obtaining the difference between the respective light-reception signals obtained from the two light-reception surfaces of the split light-reception surface 77b.

Thus, in the system of FIG. 19A, the part 76b of the composite detective lens 76 splits the detection bundle of rays so as to separate a belt-shaped portion therefrom. The thus separated portion is used for producing the focusing-error signal. Further, the part 76c of the lens 76 blocks the outer part of the detection bundle of rays. Thus, functions and advantages similar to those obtained from the system of FIGS. 14A and 14B may be obtained from the system of FIGS. 19A and 19B.

Further, in the system of FIG. 19A, since the composite detective lens 76, an integral unit, acts as the knife edge and detective lens, it is not required to provide another separate element acting as the knife edge. As a result, it is not necessary to position-adjust another separate element and also no position variation of such another separate body arises, so that the system is not greatly/adversely influenced due to vibration applied to the system, for example.

An optical pick-up system in a fourteenth embodiment of the present invention will be described with reference to FIG. 21. There, the same reference numerals are designated for elements identical or corresponding to those in FIGS. 14A and 14B.

Light reflected by the recording surface of the optical disc 55 is then reflected by the division surface 53a of the beam splitter 53. A part of the thus reflected light is then blocked by a blocking plate 78. The remaining part of the light is incident on the detective lens 56 so as to become converging.

Almost all of the bundle of rays transmitted by the detective lens 56 is reflected by the knife edge prism 57. The thus obtained reflected light is then received by the split light-reception surface 58. Further, the part of the detection bundle of rays remaining, that is, not reflected by the knife edge prism 57 is received by the split light-reception surface 59.

Figure 21:
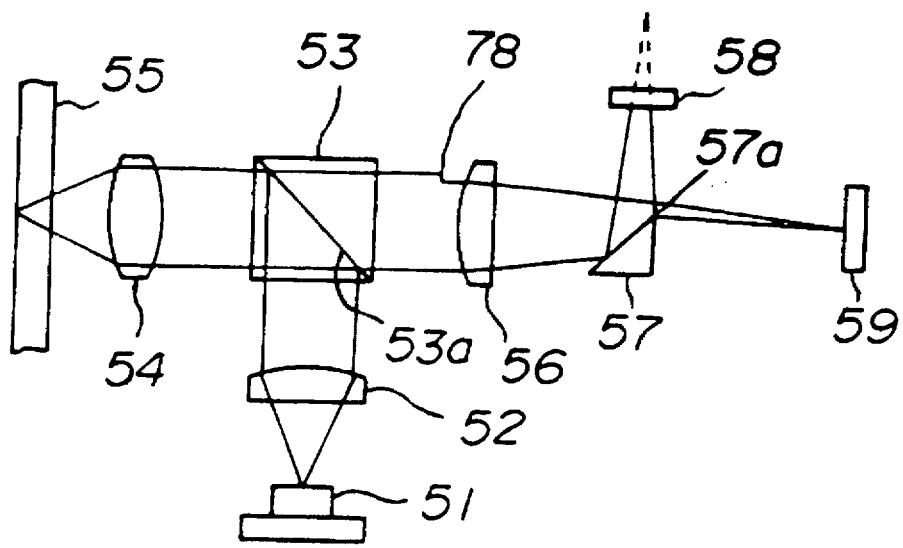
FIG. 21 shows essential elements of an optical system in an optical pick-up system in a fourteenth embodiment according to the present invention.
Figure 22:
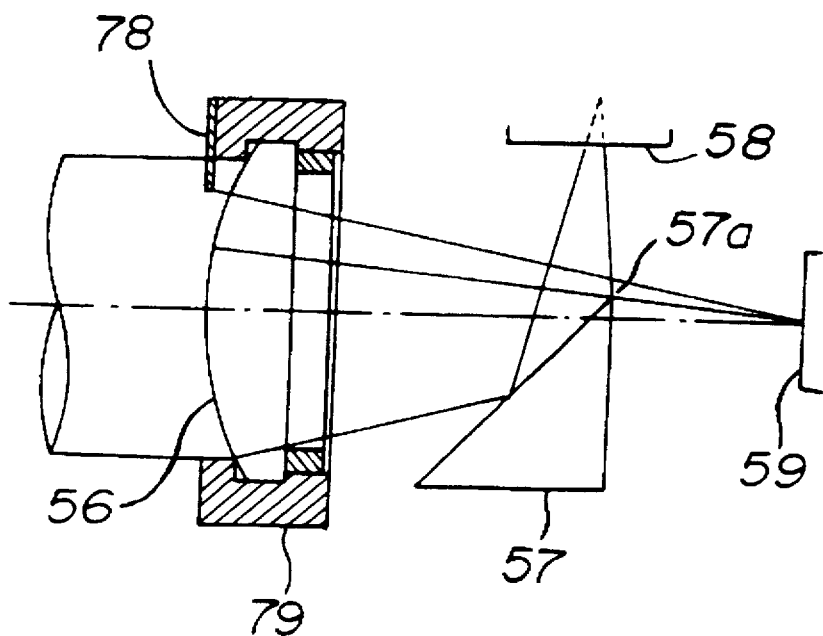
FIG. 22 shows the function of the system of FIG. 21.

There, as shown in FIG. 22, the bundle of rays received by the split light-reception surface 59 comprises that remaining after the outer part of the detection bundle of rays has been blocked by the blocking plate 78. The outer part of the detection bundle of rays greatly varies in its advancing direction due to the laser-beam defocusing such as described above in the description of the eleventh embodiment. As a result of blocking this outer part, the spot-position variation (on the split light-reception surface 59) due to the defocusing is small. That is, it is possible to effectively reduce the detective sensitivity in the focusing-error detection in the system of FIG. 21. In the system of FIG. 22, a holder 79 is provided for mounting the blocking plate 77 onto the detective lens 56.

Further, the system of FIG. 21 has a simple construction resulting from adding only the blocking plate 78 to the system of the related art as shown in FIG. 2A, for example. Thus, it is possible to reduce costs for the relevant system. Further, the amount of blocking of the outer part of the detection bundle of rays may be easily adjusted so as to obtain a desired amount by adjusting the position of the blocking plate 78.

Although the blocking plate 78 is disposed at the incident side of the detective lens 56, it is also possible to dispose the blocking plate 78 at the light-exit side of the detective lens 56.

Further, the present invention is not limited to the above described embodiments, and variations and modifications may be made without departing from the scope of the present invention.

What is claimed is:

1. An optical pick-up system comprising:

a light source for emitting light;

an objective lens for causing light emitted from said light source to converge onto an optical recording medium;

a beam splitter for separating light, reflected from said optical recording medium, from the bundle of rays emitted from said light source;

a detective lens for causing said light, reflected from said optical recording medium and then separated by means of said beam splitter, to converge; and a detective photosensitive element disposed at a position at which the light converged by means of said detective lens approximately converges;

and wherein:

said detective lens has first and second surfaces, said second surface of said detective lens being behind said first surface;

said first surface faces said beam splitter and is formed to be convex so as to cause the bundle of rays to converge; and said second surface comprises two component surfaces which are combined with one another so that the line of intersection, formed where said two component surfaces meet, does not intersect the axis associated with the convexity of said first surface.

2. The optical pick-up system according to claim 1, wherein the shape of said second surface of said detective lens is made to provide bundles of rays in such a way as to enable said detective photosensitive element to simultaneously act as two different photosensitive elements for generating the focusing-error signal and for generating the tracking-error signal respectively.

3. An optical pick-up system comprising:

a light source for emitting light;

an objective lens for causing light emitted from said light source to converge onto an optical recording medium;

a beam splitter for separating light, reflected from said optical recording medium, from the bundle of rays emitted from said light source;

a detective lens for causing said light, reflected from said optical recording medium and then separated by means of said beam splitter, to converge; and a detective photosensitive element disposed at a position at which the light converged by means of said detective lens approximately converges;

and wherein:

said detective lens has first and second surfaces, said second surface of said detective lens being behind said first surface;

said first surface faces said beam splitter and is formed to be convex so as to cause the bundle of rays to converge; and said second surface comprises a convex surface and a plane surface which are combined with one another so that the line of intersection, formed where said convex surface and plane surface meet, does not intersect the axis associated with the convexity of said first surface.

4. The optical pick-up system according to claim 3, wherein the shape of said second surface of said detective lens is made to provide bundles of rays in such a way as to enable said detective photosensitive element to simultaneously act as two different photosensitive elements for generating the focusing-error signal and for generating the tracking-error signal respectively.

5. An optical pick-up system comprising:

a light source for emitting light;

an objective lens for causing light emitted from said light source to converge onto an optical recording medium;

a beam splitter for separating light, reflected from said optical recording medium, from the bundle of rays emitted from said light source;

a detective lens for causing said light, reflected from said optical recording medium and then separated by means of said beam splitter, to converge; and a detective photosensitive element disposed at a position at which the light converged by means of said detective lens approximately converges;

and wherein:

said detective lens has first and second surfaces, said second surface of said detective lens being behind said first surface;

said first surface faces said beam splitter and is formed to be convex so as to cause the bundle of rays to converge; and said second surface is shaped to provide bundles of rays in such a way as to enable said detective photosensitive element to simultaneously act as two different photosensitive elements for generating the focusing-error signal and for generating the tracking-error signal respectively.

6. An optical pick-up system comprising:

a light source for emitting light;

an objective lens for causing light emitted from said light source to converge onto an optical recording medium;

a beam splitter for separating light, reflected from said optical recording medium, from the bundle of rays emitted from said light source;

a detective lens for causing said light, reflected from said optical recording medium and then separated by means of said beam splitter, to converge; and a detective photosensitive element disposed at a position at which the light converged by means of said detective lens approximately converges;

and wherein:

said detective lens has first and second surfaces, said second surface of said detective lens being behind said first surface;

said first surface faces said beam splitter and is formed to be convex so as to cause the bundle of rays to converge; and said second surface comprises two component surfaces which are combined with one another so that the line of intersection, formed where said two component surfaces meet, intersects the axis associated with the convexity of said first surface.

7. The optical pick-up system according to claim 6, wherein the shape of said second surface of said detective lens is made to provide bundles of rays in such a way as to enable said detective photosensitive element to simultaneously act as two different photosensitive elements for generating the focusing-error signal and for generating the tracking-error signal respectively.

8. An optical pick-up system comprising:

a light source for emitting light;

an objective lens for causing light emitted from said light source to converge onto an optical recording medium;

a beam splitter for separating light, reflected from said optical recording medium, from the bundle of rays emitted from said light source;

a detective lens for causing said light, reflected from said optical recording medium and then separated by means of said beam splitter, to converge; and a detective photosensitive element disposed at a position at which the light converged by means of said detective lens approximately converges;

and wherein:

said detective lens has first and second surfaces, said second surface of said detective lens being behind said first surface;

said first surface faces said beam splitter and is formed to be convex so as to cause the bundle of rays to converge; and said second surface comprises a concave surface and a plane surface which are combined with one another so that the line of intersection, formed where said concave surface and plane surface meet, does not intersect the axis associated with the convexity of said first surface.

9. The optical pick-up system according to claim 8, wherein the shape of said second surface of said detective lens is made to provide bundles of rays in such a way as to enable said detective photosensitive element to simultaneously act as two different photosensitive elements for generating the focusing-error signal and for generating the tracking-error signal respectively.

10. An optical pick-up system for focusing control using a knife-edge method comprising:

a transparent plate disposed in the path of a converging bundle of rays separated from a light path originating from a light source and arriving at an optical disc so that a part of said bundle of rays is incident on said transparent plate, said converging bundle of rays having been reflected by the recording surface of said optical disc, and said transparent plate having a straight edge part, said straight edge part being approximately straight along a direction approximately perpendicular to a direction along which said bundle of rays is incident on said transparent plate;

a first dual-surface photosensitive element for receiving the bundle of rays that has been transmitted by said transparent plate incident on said first dual-surface photosensitive element; and a second dual-surface photosensitive element for receiving the bundle of rays that converges without being incident on said transparent plate incident on said second dual-surface photosensitive element.

11. The optical pick-up system according to claim 10, wherein:

the two surfaces of said transparent plate are parallel; and said transparent plate is disposed obliquely to the incident direction of said converging bundle of rays.

12. The optical pick-up system according to claim 10, wherein:

the two surfaces of said transparent plate are non-parallel; and said transparent plate has a wedge-shape lateral cross-section.

13. The optical pick-up system according to claim 10, wherein:

a polarization splitting layer is provided on the incident surface of said transparent plate; and said optical pick-up system is arranged so that the bundle of rays reflected by said polarizing splitting layer is made to be incident on a third photosensitive element.

14. The optical pick-up system according to claim 10, wherein $\Theta_1 > \alpha > \Theta_2$;

where:

$\alpha$ is the angle formed between the end surface on said straight edge part and the normal to the incident surface of said transparent plate;

$\Theta_1$ is the incident angle of the light incident on said straight edge part; and $\Theta_2$ is the reflection angle of said light incident on said straight edge part.

15. The optical pick-up system according to claim 10, wherein:

one of said first and second dual-surface photosensitive elements is used for generating a tracking-error signal and the other is used for generating a focusing-error signal; and said first and second dual-surface photosensitive elements are formed in a single unit.

16. An optical pick-up system, comprising:

a light source for emitting light;

an objective lens for converging the bundle of rays emitted from said light source on an optical recording medium;

a beam splitter for separating the light, reflected by said optical recording medium, from said bundle of rays emitted from said light source; and a detective optical system for introducing the separated reflected light thereto as detective light, said detective optical system then forming various signals; and wherein said detective optical system comprises:

bundle-of-rays splitting means for separating a part of the bundle of rays of said detective light so that the separated part of the bundle of rays has a belt-shaped cross-section;

a detective lens for converging the bundle of rays separated by means of said bundle-of-rays splitting means; and a dual-surface photosensitive element, a light-reception surface of which is divided into two parts in a predetermined direction, for receiving the bundle of rays converged by said detective lens;

and wherein said optical pick-up system detects the focusing error of said objective lens, using the difference between the respective light-reception signals output from the two parts of the divided light-reception surface of said dual-surface photosensitive element.

17. The optical pick-up system, according to claim 16, wherein said bundle-of-rays splitting means comprises a transmitting triangular prism column.

18. The optical pick-up system, according to claim 16, wherein said bundle-of-rays splitting means comprises a transmitting parallel-plane plate provided with a non-parallel part.

19. An optical pick-up system, comprising:

a light source for emitting light;

an objective lens for converging the bundle of rays emitted from said light source on an optical recording medium;

a beam splitter for separating the light, reflected by said optical recording medium, from said bundle of rays emitted from said light source; and a detective optical system for introducing the separated reflected light thereto as detective light, said detective optical system then forming various signals; and wherein said detective optical system comprises:

a detective lens for converging said detective light;

bundle-of-rays splitting means, inserted in the converging bundle of rays converged by means of said detective lens, for separating a part of said converging bundle of rays so that the separated part of the bundle of rays has a belt-shaped cross-section; and a dual-surface photosensitive element, a light-reception surface of which is divided into two parts in a predetermined direction, for receiving the bundle of rays separated by means of said bundle-of-rays splitting means;

and wherein said optical pick-up system detects the focusing error of said objective lens, using the difference between the respective light-reception signals output from the two parts of the divided light-reception surface of said dual-surface photosensitive element.

20. The optical pick-up system, according to claim 19, wherein said bundle-of-rays splitting means comprises a transmitting parallel-plane plate provided with a non-parallel part.

21. The optical pick-up system according to claim 19, wherein said bundle-of-rays splitting means comprises a transmitting triangular prism column.

22. The optical pick-up system according to claim 19, wherein:

said bundle-of-rays splitting means comprises a knife-edge prism; and said detective optical system further comprises a light-blocking member, disposed before said detective lens, for blocking a belt-shaped cross-section part of the converging bundle of rays to be received by said dual-surface photosensitive element.

23. An optical pick-up system comprising:

a light source for emitting light;

an objective lens for converging the bundle of rays emitted from said light source on an optical recording medium;

a beam splitter for separating the light, reflected by said optical recording medium, from said bundle of rays emitted from said light source; and a detective optical system for introducing the separated reflected light thereto as detective light, said detective optical system then forming various signals; and wherein said detective optical system comprises:

a composite detective lens for converging said detective light, said composite detective lens being provided with light-flux splitting means for then separating a part of the bundle of rays of the thus converged bundle of rays so that the separated part of the bundle of rays has a belt-shaped cross-section; and a dual-surface photosensitive element, a light-reception surface of which is divided into two parts in a predetermined direction, for receiving the bundle of rays converged by said detective lens;

and wherein said optical pick-up system detects the focusing error of said objective lens, using the difference between the respective light-reception signals output from the two parts of the divided light-reception surface of said dual-surface photosensitive element.

24. An optical pick-up system, comprising:

a light source for emitting light;

an objective lens for converging the bundle of rays emitted from said light source on an optical recording medium;

a beam splitter for separating the light, reflected by said optical recording medium, from said bundle of rays emitted from said light source; and a detective optical system for introducing the separated reflected light thereto as detective light, said detective optical system then forming various signals; and wherein said detective optical system comprises:

means for separating a part of the bundle of rays of said detective light so that the separated part of the bundle of rays has a belt-shaped cross-section; and means for either converging said bundle of rays of said detective light before it is separated by said bundle-of-rays separating means or converging said part of said bundle of rays and remaining part of said bundle of rays which have been obtained as a result of being separated by said bundle-of-rays separating means; and a dual-surface photosensitive element, a light-reception surface of which is divided into two parts in a predetermined direction, for receiving the bundle of rays obtained as a result of being slitted and converged by the respective means;

and wherein said optical pick-up system detects the focusing error of said objective lens, using the difference between the respective light-reception signals output from the two parts of the divided light-reception surface of said dual-surface photosensitive element.

\* \* \* \* \*